(12) United States Patent  
Ogata

(10) Patent No.: US 8,064,316 B2  
(45) Date of Patent: Nov. 22, 2011

(54) OPTICAL SYSTEM, OPTICAL PICKUP APPARATUS, AND OPTICAL DISC APPARATUS FOR EXTRACTING SIGNAL BEAMS

(75) Inventor: Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 652 days.

(21) Appl. No.: 12/091,048

(22) PCT Filed: Aug. 13, 2007

(86) PCT No.: PCT/JP2007/066074  
§ 371 (c)(1),  
(2), (4) Date: Apr. 21, 2008

(87) PCT Pub. No.: WO2008/023652  
PCT Pub. Date: Feb. 28, 2008

(65) Prior Publication Data  
US 2010/0135143 A1 Jun. 3, 2010

(30) Foreign Application Priority Data

Aug. 22, 2006 (JP) .............................. 2006-225151  
May 7, 2007 (JP) .............................. 2007-122024  
May 18, 2007 (JP) .............................. 2007-132385

(51) Int. Cl.  
*G11B 7/00* (2006.01)

(52) U.S. Cl. .................... 369/112.17; 369/94

(58) Field of Classification Search .................. None  
See application file for complete search history.

(56) References Cited

U.S. PATENT DOCUMENTS

| 6,442,125 B1 * | 8/2002 | Maeda et al. ............. 369/112.1 |
| 2005/0161579 A1 | 7/2005 | Kim et al. |
| 2008/0025188 A1 * | 1/2008 | Nagai ..................... 369/112.04 |

FOREIGN PATENT DOCUMENTS

| JP | 8-185640 | 7/1996 |
| JP | 2624255 | 4/1997 |
| JP | 2000-163795 | 6/2000 |
| JP | 2002-367211 | 12/2002 |
| JP | 2003-323736 | 11/2003 |
| JP | 2005-228436 | 8/2005 |
| JP | 2006-127569 | 5/2006 |
| JP | 2006-344344 | 12/2006 |
| TW | 200523910 A | 7/2005 |
| WO | WO 2005/078714 A1 | 8/2005 |
| WO | WO 2005/104111 | 11/2005 |
| WO | WO 2006/043572 A1 | 4/2006 |
| WO | WO 2006/093326 A1 | 9/2006 |

OTHER PUBLICATIONS

Ogata, T., et al. "Novel Read-out Technology for Multi-layer Disk using Polarization Device", Optical Data Storage Topical Meeting 2006, Jun. 5, 2006, pp. 31-33.

* cited by examiner

*Primary Examiner* — Joseph Haley  
(74) *Attorney, Agent, or Firm* — Dickstein Shapiro LLP

(57) ABSTRACT

An optical system for efficiently extracting plural signal beams from a bundle of rays reflected from a multilayer optical disc.

8 Claims, 27 Drawing Sheets

OPTICAL SYSTEM, OPTICAL PICKUP APPARATUS, AND OPTICAL DISC APPARATUS FOR EXTRACTING SIGNAL BEAMS

TECHNICAL FIELD

The present invention relates to an optical system, an optical pickup apparatus, and an optical disc apparatus, and more particularly to an optical system for extracting signal beams from a bundle of rays including signal beams and stray beams, an optical pickup apparatus including the optical system, and an optical disc apparatus including the optical pickup apparatus.

BACKGROUND ART

In recent years and continuing, optical discs (e.g., CDs (Compact Disc) and DVDs (Digital Versatile Disc)) serving to record computer programs, audio information, video information (hereinafter also referred to as "contents") are drawing greater attention due to the advances in digital technology and the improvements in data compression technology. Accordingly, as the optical discs become less expensive, optical disc apparatuses for reproducing the information recorded in the optical discs have grown to become widely used.

The amount of information to be recorded in the optical discs is growing year by year. Therefore, further increase in the recording capacity of a single optical disc is expected. As for measures that are being developed for increasing the recording capacity of the optical disc, there is, for example, increasing the number of recording layers. Accordingly, vigorous research is being made on optical discs having plural recording layers (hereinafter referred to as "multilayer disc") and optical disc apparatuses that access the multilayered discs.

In the multilayer discs, there is a possibility that the signals from a target recording layer be adversely affected by spherical aberration if the spaces between the recording layers are too large. Accordingly, there is a trend of reducing the space between the recording layers. However, reducing the space between the recording layers causes cross-talk between the recording layers (so-called "interlayer cross-talk"). As a result, the bundle of rays returning (reflected) from the multilayer disc contains not only desired beams reflected from a target recording layer (hereinafter referred to as "signal beams") but also a significant amount of undesired beams reflected from recording layers besides the target recording layer (hereinafter referred to as "stray beams"). This leads to the decrease in S/N ratio of reproduction signals.

An apparatus which reduces interlayer cross-talk during reproduction of a multilayer disc is proposed in, for example, Japanese Registered Patent No. 2624255.

However, the apparatus disclosed in Japanese Registered Patent No. 2624255 requires the diameter of a pinhole to be further reduced in order to further reduce stray beams incident on a detector. The reduction of incident stray beams, however, leads to undesired reduction of signal beams incident on the detector.

DISCLOSURE OF INVENTION

The present invention may provide an optical system, an optical pickup apparatus, and an optical disc apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention can be realized and attained by an optical system, an optical pickup apparatus, and an optical disc apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an optical system for extracting a plurality of signal beams from a bundle of rays reflected from a multilayer optical disc, the reflected bundle of rays including the plural signal beams and a plurality of stray beams, the optical system including: a polarizer situated on an optical path of the reflected bundle of rays for splitting the reflected bundle of rays; a condensing optical element situated in front or in back of the polarizer for condensing the reflected bundle of rays; a first polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the first polarization converting optical element having a plurality of divided areas for dividing the plural signal beams and the plural stray beams into two bundle of rays and converting polarization of the divided bundle of rays so that one of the divided bundle of rays has a polarization different from the other divided bundle of rays; a second polarization converting optical element situated between the first imaginary plane and a third imaginary plane located farther from the condensing optical element than the first imaginary plane, the third imaginary plane including condensing areas at which the plural stray beams are condensed, the second polarization converting optical element having a plurality of divided areas facing the plural divided areas of the first polarization converting optical element for converting the polarization of the plural signal beams and the plural stray beams transmitted through the first polarization converting optical element so that the plural signal beams has a polarization different from the plural stray beams; and an analyzer for extracting the plural signal beams from the reflected bundle of rays transmitted through the second polarization converting optical element based on the difference of polarization.

Furthermore, another embodiment of the present invention provides an optical system for extracting a plurality of signal beams from a bundle of rays reflected from a multilayer optical disc, the reflected bundle of rays including the plural signal beams and a plurality of stray beams, the optical system including: a polarizer situated on an optical path of the reflected bundle of rays for splitting the reflected bundle of rays; a condensing optical element situated in front or in back of the polarizer for condensing the reflected bundle of rays; a polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the polarization converting opti- cal element having a plurality of divided areas for dividing the plural signal beams and the plural stray beams into two bundle of rays and converting polarization of the divided bundle of rays so that one of the divided bundle of rays has a polarization different from the other divided bundle of rays; and a reflecting member situated on the first imaginary plane for reflecting the reflected bundle of rays transmitted through the polarization converting optical element to the polarization converting optical element; wherein the reflected bundle of rays reflected from the reflecting member are incident on the polarizer and has the plural signal beams extracted therefrom based on the difference of polarization by the polarizer.

Furthermore, another embodiment of the present invention provides an optical pickup apparatus for irradiating a bundle of rays to an optical disc having a plurality of recording layers and receiving reflected bundle of rays from the optical disc, the optical pickup apparatus including: a light source for irradiating a linearly polarized beam; a grating for diffracting the linearly polarized beam to a plurality of bundles of rays; an objective lens for condensing the plural bundles of rays to a target recording layer included in the plural recording layers; a ¼ wave-plate situated on an optical path between the grating and the objective lens for adding an optical phase difference of ¼ wavelength to incident bundle of rays; the optical system according to an embodiment of the present invention situated on an optical path of the bundle of rays reflected from the optical disc and transmitted through the objective lens and the ¼ wave-plate; and a photo-detector for receiving the bundle of rays from the optical system and generating signals according to the amount of light of the received bundle of rays.

Furthermore, another embodiment of the present invention provides an optical disc apparatus capable of at least reproducing information from an optical disc having a plurality of recording layers, the optical disc including: the optical pickup apparatus according to an embodiment of the present invention; and a processing apparatus for reproducing information recorded in the optical disc according to the signals output from the photo-detector of the optical pickup apparatus.

BEST MODE FOR CARRYING OUT THE INVENTION

Figure 1:
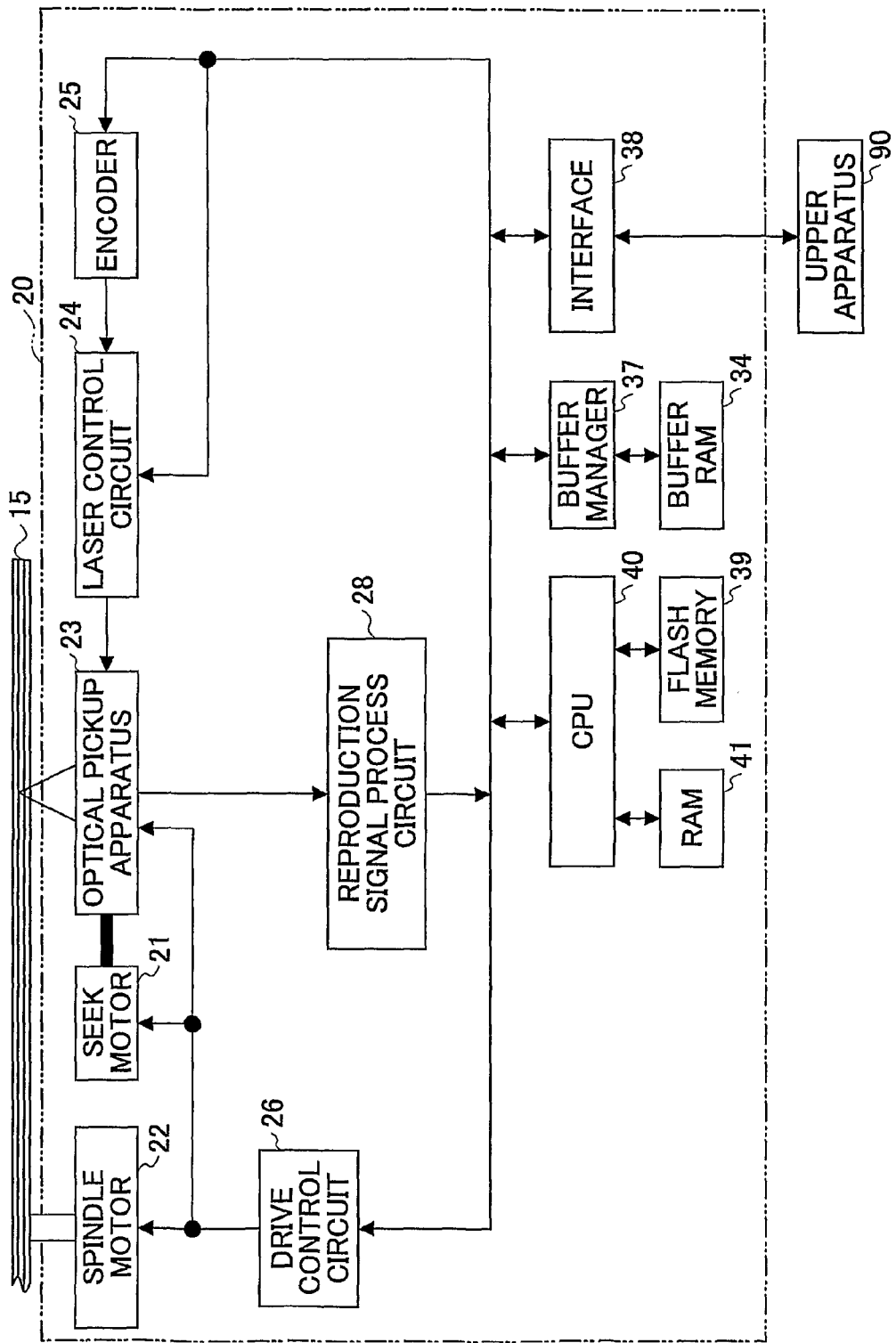
FIG. 1 is a schematic diagram showing a configuration of an optical disc apparatus according to an embodiment of the present invention.

The present invention is described in detail based on the embodiments illustrated in FIGS. 1-11. FIG. 1 is a schematic diagram showing a configuration of an optical disc apparatus 20 according to an embodiment of the present invention.

The optical disc apparatus 20 shown in FIG. 1 includes, for example, a spindle motor 22 for rotating an optical disc 15, an optical pickup apparatus 23, a seek motor 21 for driving the optical pickup apparatus 23 in a radial direction of the optical disc 15, a laser control circuit 24, an encoder 25, a drive control circuit 26, a reproduction signal process circuit 28, a buffer RAM 34, a buffer manager 37, an interface 38, a flash memory 39, a CPU 40, and a RAM 41. The spindle motor 22 is for rotating an optical disc 15. The arrows illustrated in FIG. 1 indicate an exemplary flow of signals and information and do not indicate all connections among the blocks (components) illustrated in FIG. 1. Furthermore, the optical disc apparatus 20 according to an embodiment of the present invention is applicable to a multilayer disc.

Figure 2:
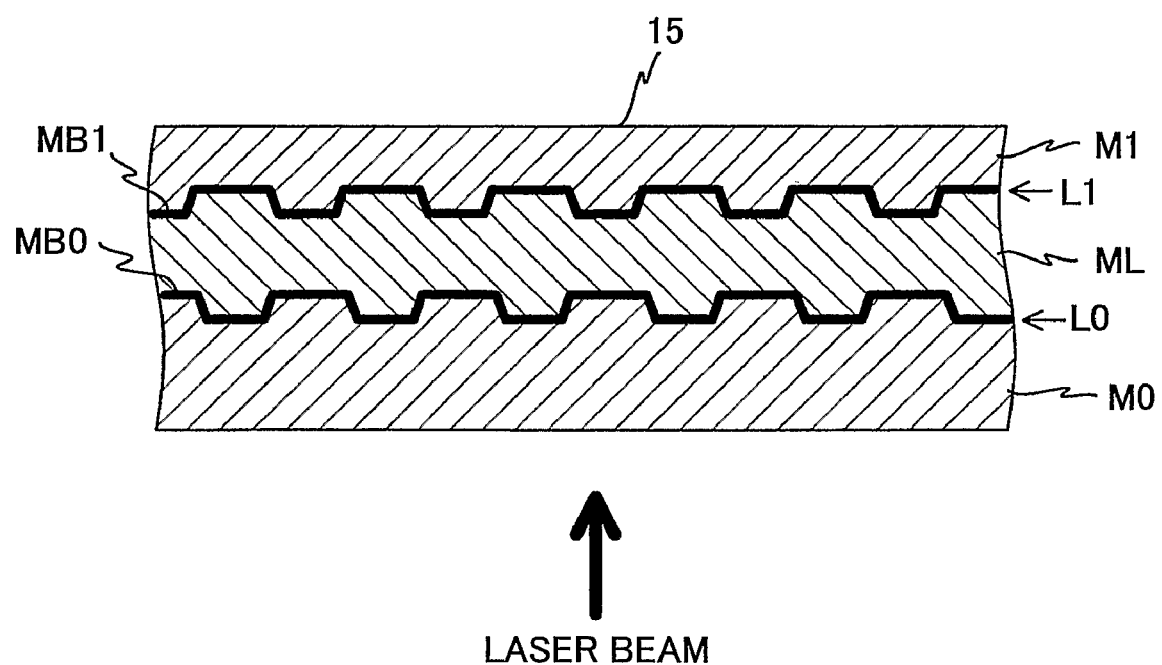
FIG. 2 is a schematic diagram for describing an exemplary configuration of an optical disc shown in FIG. 1 according to an embodiment of the present invention.

As shown in FIG. 2, the optical disc 15 includes, for example, a first substrate M0, a first recording layer L0, an intermediate layer ML, a second recording layer L1, and a second substrate M1 that are layered in this order from an incident direction of a bundle of rays (arrow direction of laser beam in FIG. 2) to the optical disc 15. Furthermore, a translucent film MB0 that is formed of, for example, a metal material (e.g., gold) or a dielectric material is provided between the first recording layer L0 and the intermediate layer ML. Furthermore, a reflection film MB1 that is formed of, for example, a metal material (e.g., aluminum) is provided between the second recording layer L1 and the second substrate M1. The intermediate layer ML includes a UV curing resin material having high transmittance with respect to the irradiated bundle of rays and a refractive index that is similar to that of the substrates. That is, the optical disc 15 is a single sided dual layer disc. Each recording layer has one or more tracks formed with spiral or concentric guiding grooves. The optical disc 15 has the first recording layer L0 situated closer to the optical disc apparatus 20 than the second recording layer L1. Accordingly, a portion of the bundle of rays incident on the optical disc 15 is reflected at the translucent film MB0, and the remaining portion of the bundle of rays is transmitted through the translucent film MB0. Then, the bundle of rays transmitted through the translucent film MB0 is reflected by the reflection film MB1. In this embodiment of the present invention, the optical disc 15 is a DVD type information recording medium.

Figure 3:
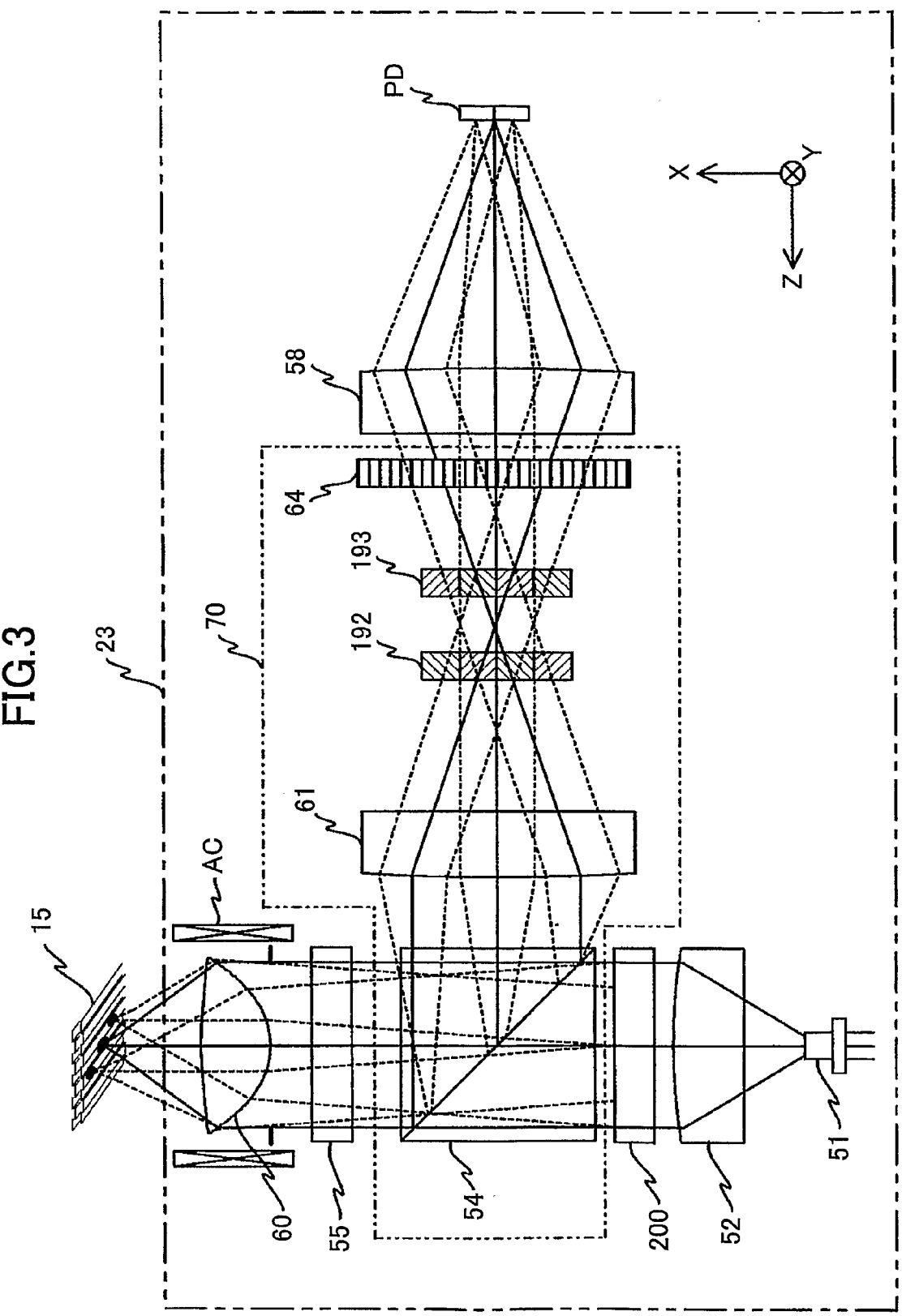
FIG. 3 is a schematic diagram for describing an optical pickup apparatus shown in FIG. 1 according to an embodiment of the present invention.

The optical pickup apparatus 23 is for irradiating a laser beam onto one of the two recording layers of the optical disc 15 to which access is sought (hereinafter referred to as "target recording layer") and for receiving rays of light reflected from the optical disc 15. As shown in FIG. 3, the optical pickup apparatus 23 includes, for example, a light source unit 51, a coupling lens 52, a grating 200, a ¼ wave plate 55, an objective lens 60, an optical system 70, a condenser lens 58, a photo detector PD serving as a light receiving unit and a drive system including a focusing actuator AC and a tracking actuator (not shown) for driving the objective lens 60.

The optical system 70 includes a polarization beam splitter 54 serving as a polarizer, a lens 61 serving as a condensing optical element, two polarization converting optical elements (192, 193), and an analyzer 64.

The light source unit 51 includes, for example, a semiconductor laser serving as a light source for irradiating a laser beam having a wavelength complying with the optical disc 15 (in this example, approximately 660 nm). In this embodiment of the present invention, the direction of the laser beam of the maximum strength irradiated from the light source unit 51 is in the +X direction. Furthermore, the light source unit 51 irradiates, for example, a bundle of polarized rays that is parallel to the incident plane of the polarization beam splitter 54 (P polarized light).

The coupling lens 52, being positioned at the +X side of the light source unit 51, makes the bundle of rays irradiated from the light source unit 51 into substantially parallel rays.

The grating 200 is positioned at the +X side of the coupling lens 52. The grating 200 divides the substantially parallel rays from the coupling lens 52 into three bundles of rays which are a $0^{th}$ order beam (hereinafter also referred to as "$0^{th}$ order light"), a positive first order diffraction beam (hereinafter also referred to as "+$1^{st}$ order beam" or "+$1^{st}$ order light"), and a negative first order diffraction beam (hereinafter also referred to as "−$1^{st}$ order beam" or "−$1^{st}$ order light"). That is, the grating 200 changes the incident bundle of rays into three beams. More specifically, in this example, the grating 200 divides the incident rays so that 80% of the bundle of incident rays becomes the $0^{th}$ order beam, 10% of the bundle of incident rays becomes the +$1^{st}$ order beam, and 10% of the bundle of incident rays becomes the −$1^{st}$ order beam. Furthermore, the +$1^{st}$ order beam and the −$1^{st}$ order beam may hereinafter be collectively referred to as "±$1^{st}$ order beam" for the sake of convenience.

The polarization beam splitter 54 is positioned at the +X side of the grating 200. The reflectance of the polarization beam splitter 54 varies depending on the polarization of the incident bundle of rays. In this example, the polarization beam splitter 54 is set to have decreasing reflectance with respect to the P polarized beam and an increasing reflectance with respect to the S polarized beam. That is, the polarization beam splitter 54 splits the S polarized beam included in the incident bundle of rays. Therefore, a large portion of the bundle of rays irradiated from the light source unit 51 can transmit through the polarization beam splitter 54. The ¼ wave plate 55 is positioned at the +X side of the polarization beam splitter 54.

The ¼ wave plate 55 provides a phase difference of a ¼ wavelength with respect to the bundle of rays incident on the ¼ wave plate 55. The objective lens 60, being positioned at the +X side of the ¼ wave plate 55, condenses the bundle of rays transmitted through the ¼ wave plate onto the target recording layer.

Since the incident angle for each bundle of rays ($0^{th}$ order beam, ±$1^{st}$ order beam) incident on the objective lens 60 is different, the bundles of rays transmitted through the objective lens 60 condense at different areas on the target recording layer. For example, in a case where track error is detected by using a differential push-pull method, the optical pickup apparatus 23 is set to condense the $0^{th}$ order beam on the groove of the target recording layer and condense each of the +$1^{st}$ and −$1^{st}$ order beams to a corresponding land situated adjacent to the groove onto which the $0^{th}$ order beam is condensed.

The focusing actuator AC is for precisely driving (moving) the objective lens 60 in the focus direction, that is, the direction of the optical axis of the objective lens 60. For the sake of convenience, in a case where the target recording layer is the first recording layer L0, the optimum position of the objective lens 60 with respect to the focus direction is referred to as "first lens position", and in a case where the target recording layer is the second recording layer L1, the optimum position of the objective lens 60 with respect to the focus direction is referred to as "second lens position". The distance between the objective lens 60 and the optical disc 15 is shorter in a case where the objective lens 60 is in the second lens position compared to a case where the objective lens 60 is in the first lens position (See FIGS. 4A and 4B).

The tracking actuator (not shown) is for precisely driving (moving) the objective lens 60 in the tracking direction.

Next, bundles of rays reflected from the optical disc 15 are described with reference to FIGS. 4A and 4B.

Figure 4A:
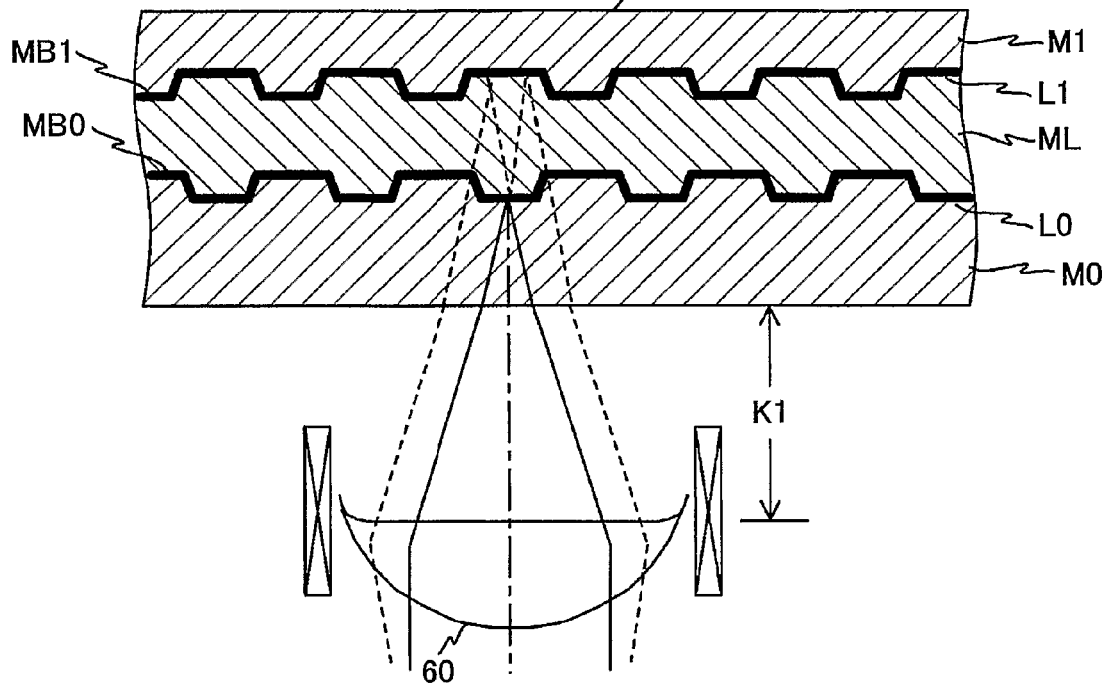
FIGS. 4A and 4B are schematic diagrams for describing signal beams and stray beams.
Figure 4B:
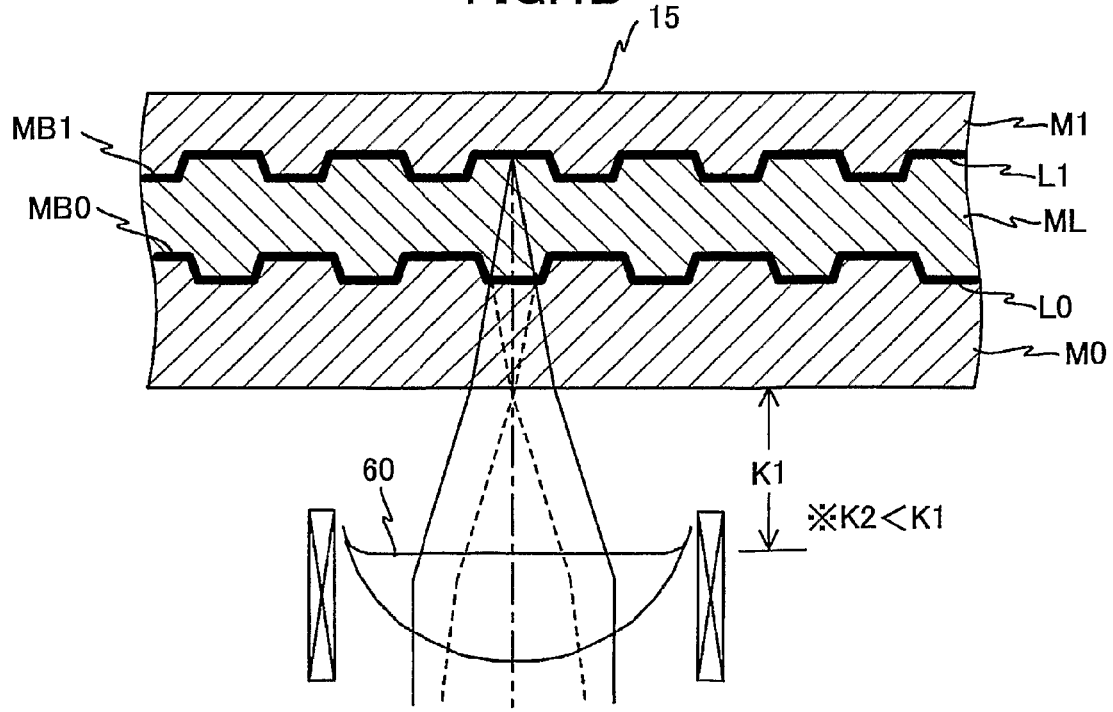

As shown in FIG. 4A, in a case where the target recording layer is the first recording layer L0, the position of the objective lens 60 is define as the first lens position. Accordingly, the objective lens 60 condenses the bundle of rays irradiated from the light source unit 51 onto the first recording layer L0. Then, a portion of the bundle of rays is reflected from the translucent film MB0 and is incident on the objective lens 60. Such portion of the bundle of rays reflected from the translucent film MB0 includes a signal beam(s) (hereinafter also referred to as "signal light"). Meanwhile, the remaining portion of the bundle of rays is transmitted through the translucent film MB0, is reflected from the reflection film MB1, and is incident on the objective lens 60. The remaining portion of the bundle of rays reflected from the reflection film MB1 includes stray beam(s) (hereinafter also referred to as "stray light").

That is, regardless of whether the target recording layer is the first recording layer L0 or the second recording layer L1, the bundle of rays reflected from the optical disc 15 includes a bundle of rays reflected from the translucent film MB0 (hereinafter referred to as "first reflected beam") and another bundle of rays reflected from the metal reflection film MB1 (hereinafter referred to as "second reflected beam"). In this example, in a case where the target recording layer is the first recording layer L0, the first reflected beam is a signal beam and the second reflected beam is a stray beam. Meanwhile, in a case where the target recording layer is the second recording layer L1, the second reflected beam is a signal beam and the first reflected beam is a stray beam.

According to this embodiment of the present invention, since three beams ($0^{th}$ beam and $\pm 1^{st}$ order beams) are irradiated to the optical disc 15, the first reflected beam comprises a reflected beam of the $0^{th}$ order beam and reflected beams of the $\pm 1^{st}$ order beams. Likewise, the second reflected beam comprises a reflected beam of the $0^{th}$ order beam and reflected beams of the $\pm 1^{st}$ order beams. Therefore, according to this embodiment of the present invention, a signal beam may be plural signal beams that include a signal beam of the $0^{th}$ order beam and signal beams of the $\pm 1^{st}$ order beams, and a stray beam may be plural stray beams that include a stray beam of the $0^{th}$ order beam and stray beams of the $\pm 1^{st}$ order beams.

Since stray beams (stray lights) lead to reduction of S/N ratio when detecting various signals in the reproduction signal process circuit 28, signal beams (signal lights) are to be extracted from the bundles of rays reflected from the optical disc 15.

The lens 61, being situated at the –Z side of the polarization beam splitter 54, condenses the reflected bundles of rays split and oriented in the –Z direction by the polarization beam splitter 54. In the first reflected beams included in the reflected bundles of rays, the reflected beam of the $-1^{st}$ order beam is condensed to the +X side of the area to which the $0^{th}$ order beam is condensed and the reflected beam of the $-1^{st}$ order beam is condensed to the –X side of the area to which the $0^{th}$ order beam is condensed. Likewise, in the second reflected beam included in the reflected bundle of rays, the reflected beam of the $+1^{st}$ order beam is condensed to the +X side of the area to which the $0^{th}$ order beam is condensed and the reflected beam of the $-1^{st}$ order beam is condensed to the –X side of the area to which the $0^{th}$ order beam is condensed. An imaginary plane, which includes the area where the reflected beam of the $0^{th}$ order beam and the reflected beams of the $\pm 1^{st}$ order beams reflected from the same recording layer are condensed from the same recording layer, is referred to as a "condensing plane". In the optical disc 15, since the translucent film MB0 and the metal reflection film MB1 are positioned apart from each other with respect to the focus direction, the condensing plane of the first reflection beam and the condensing plane of the second reflection beam do not match. That is, the condensing plane of the first reflection beam and the condensing plane of the second reflection beam are separated from each other with respect to the direction of the optical axis of the lens 61.

Figure 5:
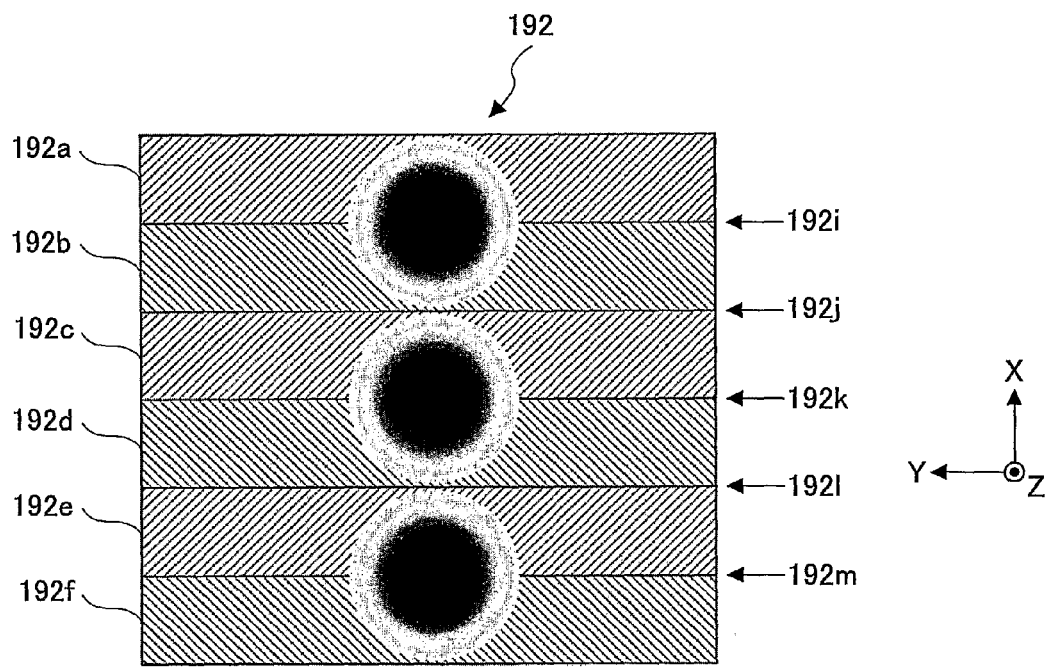
FIG. 5 is a schematic diagram for describing one of the polarization converting optical elements shown in FIG. 3 according to an embodiment of the present invention.

Returning to FIG. 3, the polarization converting optical element 192 is located on the –Z side of the lens 61 and interposed between the condensing plane of plural signal beams from the target recording layer and the condensing plane of plural stray beams from a recording layer (in this example, second recording layer L1 when the target recording layer is L0) adjacently positioned on the +X side of the target recording layer. As shown in FIG. 5, the polarization converting optical element 192 may be divided into, for example, six areas (192a, 192b, 192c, 192d, 192e, 192f) by five dividing lines (192i, 192j, 192k, 192l, 192m) extending in the Y axis direction. In this example, areas 192a, 192c, and 192e each add retardation (optical phase difference) of $-\frac{1}{4}$ wavelength to an incident bundle of rays, and areas 192b, 192d, and 192f each add retardation of $+\frac{1}{4}$ wavelength to an incident bundle of rays. It is to be noted that, when the objective lens 60 shifts in the tracking direction, the reflected bundle of rays incident on the polarization converting optical element 192 shifts in a direction corresponding to the tracking direction (in this example, Y axis direction).

The optical pickup apparatus 23 according to an embodiment of the present invention is set so that the $+1^{st}$ order beam is incident on the areas 192a and 192b, the $0^{th}$ order beam is incident on the areas 192c and 192d, and the $-1^{st}$ order beam is incident on the areas 192e and 192f.

Figure 6:
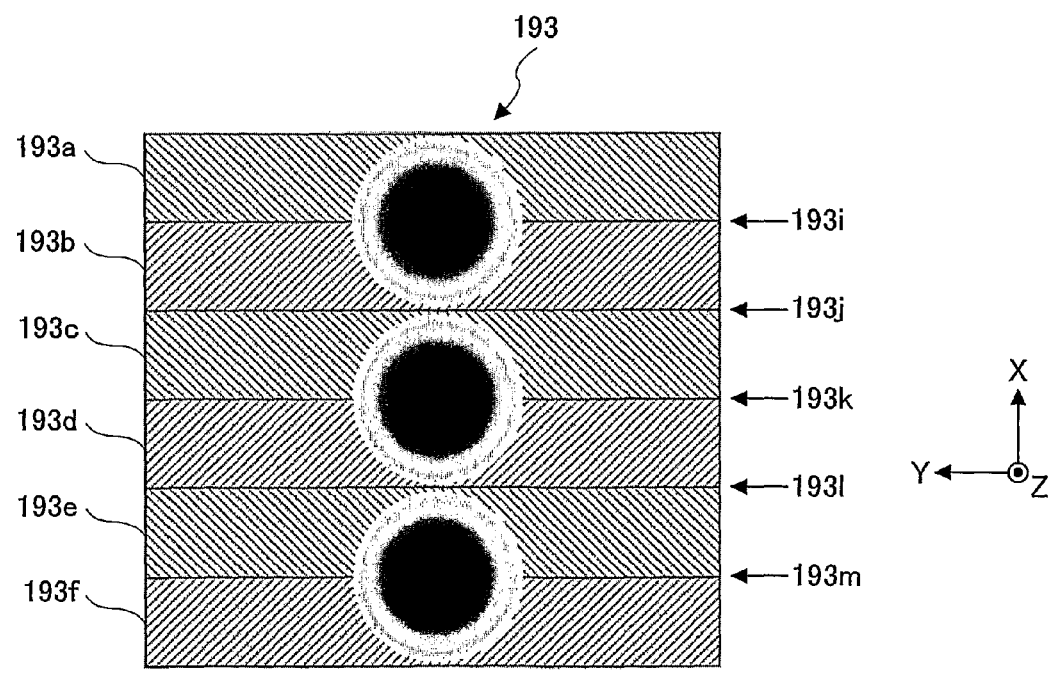
FIG. 6 is a schematic diagram for describing the other polarization converting optical element shown in FIG. 3 according to an embodiment of the present invention.

The polarization converting optical element 193 is located on the –Z side of the polarization converting optical element 192 and interposed between the condensing plane of plural signal beams from the target recording layer and the condensing plane of plural stray beams from a recording layer (in this example, first recording layer L0 when the target recording layer is L1) adjacently positioned on the –X side of the target recording layer. As shown in FIG. 6, the polarization converting optical element 193 may be divided into, for example, six areas (193a, 193b, 193c, 193d, 193e, 193f) by five dividing lines (193i, 193j, 193k, 193l, 193m) extending in the Y axis direction. In this example, areas 193a, 193c, and 193e each add retardation (optical phase difference) of $+\frac{1}{4}$ wavelength to the incident bundle of rays, and areas 193b, 193d, and 193f each add retardation of $-\frac{1}{4}$ wavelength to the incident bundle of rays. When the objective lens 60 shifts in the tracking direction, the reflected bundle of rays incident on the polarization converting optical element 193 shifts in a direction corresponding to the tracking direction (in this example, Y axis direction).

For example, a twisted nematic liquid crystal, a sub-wavelength wire-grid, or a photonic crystal may be used as the polarization converting optical elements 192, 193.

The analyzer 64, being positioned at the −Z side of the polarization converting optical element 163, only allows P polarized beams included in the bundle of rays from the polarization converting optical element 193 to transmit therethrough.

The condenser lens 58, which is located on the −Z side of the analyzer 64, condenses the reflected bundle of rays transmitted through the analyzer 64 onto the light receiving plane of the photo-detector PD. The photo-detector PD has plural photo-detecting elements (or photo-detection areas) for generating signals (photo-electric conversion signals) that are optimum for detecting, for example, RF signals, wobble signals, and servo signals in the reproduction signal process circuit 28.

Next, operation of the above-described optical pickup apparatus 23 according to an embodiment of the present invention is described with reference to FIG. 3 and FIGS. 7A-7C. It is to be noted that, in FIG. 3 and FIGS. 7A-7C, the $0^{th}$ order beam is indicated with solid lines and the $\pm 1^{st}$ order beams are indicated with broken lines.

[In a Case where the Target Recording Layer is the First Recording Layer L0]

The bundle of rays of a linearly polarized beam (in this example, P polarized beam) from the light source unit 51 is made into a bundle of substantially parallel rays by the coupling lens 52. Then, the bundle of parallel rays is divided into three beams ($0^{th}$ order beam and $\pm 1^{st}$ order beams) by the grating 200. Then, the three beams become incident on the polarization beam splitter 54. A large portion of each beam is transmitted through the polarization beam splitter 54 maintaining its parallel state, is circularly polarized by the ¼ wave plate 55, and is condensed onto the optical disc 15 by the objective lens 60, to thereby form three fine beam spots on the target recording layer L0.

Then, bundles of rays are reflected from the optical disc 15 in which the reflected bundles of rays include plural signal beams from the recording layer L0 and plural stray beams from the recording layer L1. The bundles of rays become circularly polarized in an opposite rotating direction (with respect to that of the circularly polarized rays irradiated onto the optical disc 15) and are again made into substantially parallel rays by the objective lens 60. Then, the reflected bundles of parallel rays are made into linearly polarized beams (in this example, S polarized beam) that perpendicularly intersect (with respect to that of the circularly polarized rays irradiated onto the optical disc 15) at the ¼ wave plate 55. Then, the reflected bundles of rays become incident on the polarization beam splitter 54. The bundles of rays are reflected in the −Z direction by the polarization beam splitter 54 and condensed at the lens 61.

The reflected bundles of rays transmitted through the lens 61 are incident on the polarization converting optical element 192. In the polarization converting optical element 192, the $+1^{st}$ order beam of the signal beam and the $+1^{st}$ order beam of the stray beam are incident on the areas 192a and 192b, the $0^{th}$ order beam of the signal beam and the $0^{th}$ order beam of the stray beam are incident on the areas 192c and 192d, and the $-1^{st}$ order beam of the signal beam and the $-1^{st}$ order beam of the stray beam are incident on the areas 192e and 192f. Each of the $+1^{st}$ order beams incident on the area 192a is retarded by −¼ wavelength and each of the $+1^{st}$ order beams incident on the area 192b is retarded by +¼ wavelength. Furthermore, each of the $0^{th}$ order beams incident on the area 192c is retarded by −¼ wavelength and each of the $0^{th}$ order beams incident on the area 192d is retarded by +¼ wavelength. Furthermore, each of the $-1^{st}$ order beams incident on the area 192e is retarded by −¼ wavelength and each of the $-1^{st}$ order beams incident on the area 192f is retarded by +¼ wavelength. It is to be noted that both the signal beam and the stray beam are S polarized beams between the lens 61 and the polarization converting optical element 192.

Each bundle of rays from the polarization converting optical element 192 is incident on the polarization converting optical element 193.

[Signal Beams]

Figure 7A:
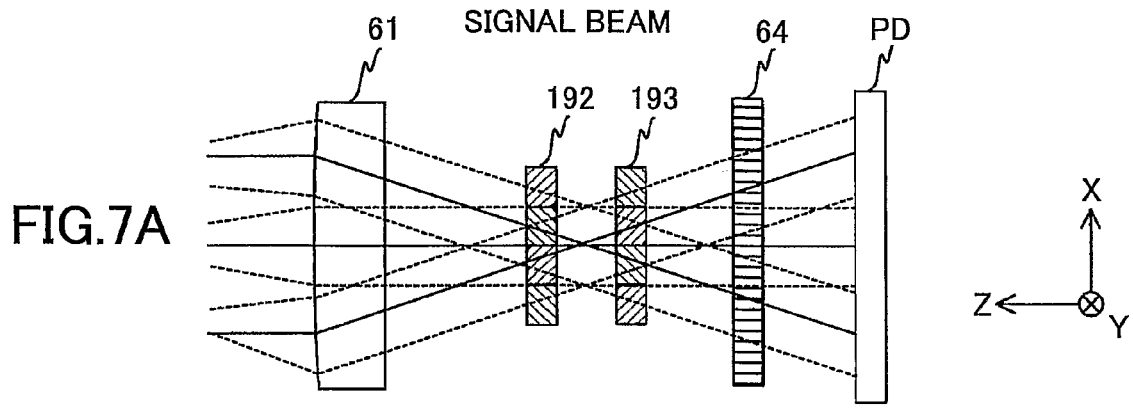
FIGS. 7A-7C are schematic diagrams for describing operation of an optical system shown in FIG. 3 according to an embodiment of the present invention.

For example, as shown in FIG. 7A, since plural signal beams are condensed between the polarization converting optical element 192 and the polarization converting optical element 193, the signal beams of the $+1^{st}$ order beams transmitted through the area 192a ($+1^{st}$ order beams retarded by −¼ wavelength) are incident on the area 193b and retarded by −¼ wavelength. The signal beams of the $+1^{st}$ order beams transmitted through the area 192b ($+1^{st}$ order beams retarded by +¼ wavelength) are incident on the area 193a and retarded by +¼ wavelength. The signal beams of the $0^{th}$ order beams transmitted through the area 192c ($0^{th}$ order beams retarded by −¼ wavelength) are incident on the area 193d and retarded by −¼ wavelength. The signal beams of the $0^{th}$ order beams transmitted through the area 192d ($0^{th}$ order beams retarded by +¼ wavelength) are incident on the area 193c and retarded by +¼ wavelength. The signal beams of the $-1^{st}$ order beams transmitted through the area 192e ($-1^{st}$ order beams retarded by −¼ wavelength) are incident on the area 193f and retarded by −¼ wavelength. The $-1^{st}$ order beams transmitted through the area 192f ($-1^{st}$ order beams retarded by +¼ wavelength) are incident on the area 193e and retarded by +¼ wavelength. Accordingly, the plural signal beams all become P polarized beams.

[Stray Beams]

Figure 7B:
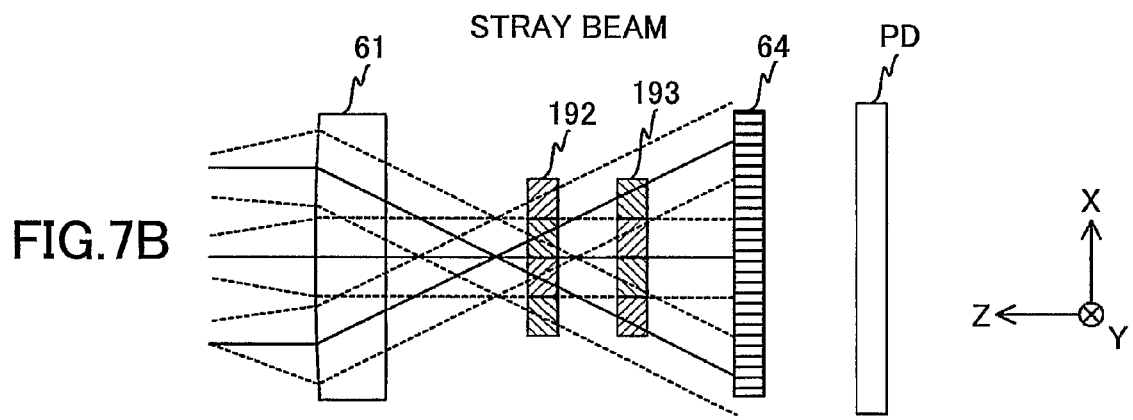

For example, as shown in FIG. 7B, since plural stray beams are condensed between the lens 61 and the polarization converting optical element 192, the stray beams of the $+1^{st}$ order beams transmitted via the area 192a ($+1^{st}$ order beams retarded by −¼ wavelength) are incident on the area 193a and retarded by +¼ wavelength. The stray beams of the $+1^{st}$ order beams transmitted via the area 192b ($+1^{st}$ order beams retarded by +¼ wavelength) are incident on the area 193b and are retarded by −¼ wavelength. The stray beams of the $0^{th}$ order beams transmitted via the area 192c ($0^{th}$ order beams retarded by −¼ wavelength) are incident on the area 193c and retarded by +¼ wavelength. The stray beams of the $0^{th}$ order beams transmitted through the area 192d ($0^{th}$ order beams retarded by +¼ wavelength) are incident on the area 193d and retarded by −¼ wavelength. The stray beams of the $-1^{st}$ order beams transmitted through the area 192e ($-1^{st}$ order beams retarded by −¼ wavelength) are incident on the area 193e and retarded by +¼ wavelength. The stray beams of the $-1^{st}$ order beams transmitted through the area 192f ($-1^{st}$ order beams retarded by +¼ wavelength) are incident on the area 193f and retarded by −¼ wavelength. Accordingly, the plural stray beams all remain S polarized beams.

The bundle of rays from the polarization converting optical element 193 is incident on the analyzer 64. Since the analyzer 64 only allows P polarized beams to transmit therethrough, only the plural signal beams are incident on the condenser lens 58 and received by the photo-detector PD. Each light receiving element (light receiving area) of the photo-detector PD performs photo-electric conversion and outputs photo-electric conversion signals to the reproduction signal process circuit 28. Since only plural signal beams are received at the photo-detector PD, photo-electric conversion signals having high S/N ratio can be output.

[In a Case where the Target Recording Layer is the Second Recording Layer L1]

The bundle of rays of a linearly polarized beam (in this example, P polarized beam) from the light source unit 51 is made into a bundle of substantially parallel rays by the coupling lens 52. Then, the bundle of parallel rays is divided into three beams ($0^{th}$ order beam and $\pm 1^{st}$ order beams) by the grating 200. Then, the three beams become incident on the polarization beam splitter 54. A large portion of each beam, which is transmitted through the polarization beam splitter 54 maintaining its parallel state, is circularly polarized by the ¼ wave plate 55, and is condensed onto the optical disc 15 by the objective lens 60, to thereby form three fine beam spots on the target recording layer L1.

Then, bundles of rays are reflected from the optical disc 15, which reflected bundles of rays include plural signal beams from the recording layer L1 and plural stray beams from the recording layer L0. The bundles of rays become circularly polarized in an opposite rotating direction (with respect to that of the circularly polarized rays irradiated to the optical disc 15) and are again made into substantially parallel rays by the objective lens 60. Then, the reflected bundles of parallel rays are made into linearly polarized beams (in this example, S polarized beam) that perpendicularly intersect with respect to that of the circularly polarized rays irradiated onto the optical disc 15 at the ¼ wave plate 55. Then, the reflected bundles of rays become incident on the polarization beam splitter 54. The bundles of rays are reflected in the −Z direction by the polarization beam splitter 54 and condensed at the lens 61.

The reflected bundles of rays transmitted through the lens 61 are incident on the polarization converting optical element 192. In the polarization converting optical element 192, the $+1^{st}$ order beam of the signal beam and the $+1^s$ order light of the stray beam are incident on the areas 192a and 192b, the $0^{th}$ order beam of the signal beam and the $0^{th}$ order beam of the stray beam are incident on the areas 192c and 192d, and the $-1^{st}$ order beam of the signal beam and the $-1^{st}$ order beam of the stray beam are incident on the areas 192e and 192f. Each of the $+1^{st}$ order beams incident on the area 192a is retarded by −¼ wavelength and each of the $+1^{st}$ order beams incident on the area 192b is retarded by +¼ wavelength. Furthermore, each of the $0^{th}$ order beams incident on the area 192c is retarded by −¼ wavelength and each of the $0^{th}$ order beams incident on the area 192d is retarded by +¼ wavelength. Furthermore, each of the $-1^{st}$ order beams incident on the area 192e is retarded by −¼ wavelength and each of the $-1^{st}$ order beams incident on the area 192f is retarded by +¼ wavelength. It is to be noted that the both the signal beam and the stray beam are S polarized beams at the optical between the lens 61 and the polarization converting optical element 192.

Each bundle of rays from the polarization converting optical element 192 is incident on the polarization converting optical element 193.

[Signal Beams]

Since plural signal beams are condensed between the polarization converting optical element 192 and the polarization converting optical element 193, the signal beams of the $+1^{st}$ order beams transmitted through the area 192a ($1^{st}$ order beams retarded by −¼ wavelength) are incident on the area 193b and retarded by −¼ wavelength. The signal beams of the $+1^{st}$ order beams transmitted through the area 192b ($+1^{st}$ order beams retarded by +¼ wavelength) are incident on the area 193a and retarded by +¼ wavelength. The signal beams of the $0^{th}$ order beams transmitted through the area 192c ($0^{th}$ order beams retarded by −¼ wavelength) are incident on the area 193d and retarded by −¼ wavelength. The signal beams of the $0^{th}$ order beams transmitted through the area 192d ($0^{th}$ order beams retarded by +¼ wavelength) are incident on the area 193c and retarded by +¼ wavelength. The signal beams of the $-1^{st}$ order beams transmitted through the area 192e ($-1^{st}$ order beams retarded by −¼ wavelength) are incident on the area 193f and retarded by −¼ wavelength. The $-1^{st}$ order beams transmitted through the area 192f ($-1^{st}$ order beams retarded by +¼ wavelength) are incident on the area 193e and retarded by +¼ wavelength. Accordingly, the plural signal beams all become P polarized beams.

[Stray Beams]

Figure 7C:
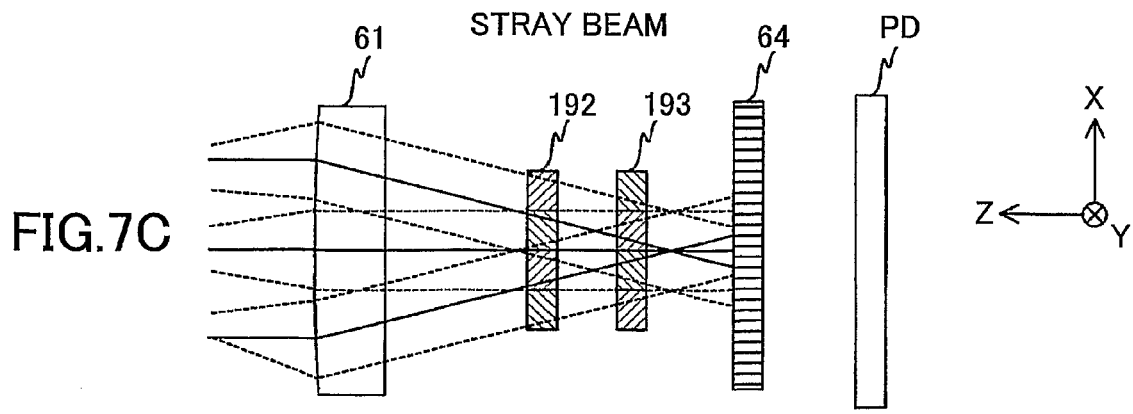

For example, as shown in FIG. 7C, since plural stray beams are condensed between the analyzer 64 and the polarization converting optical element 193, the stray beams of the $+1^{st}$ order beams transmitted via the area 192a ($+1^{st}$ order beams retarded by −¼ wavelength) are incident on the area 193a and retarded by +¼ wavelength. The stray beams of the $+1^{st}$ order beams transmitted via the area 192b ($+1^{st}$ order beams retarded by +¼ wavelength) are incident on the area 193b and are retarded by −¼ wavelength. The stray beams of the $0^{th}$ order beams transmitted via the area 192c ($0^{th}$ order beams retarded by −¼ wavelength) are incident on the area 193c and retarded by +¼ wavelength. The stray beams of the $0^{th}$ order beams transmitted through the area 192d ($0^{th}$ order beams retarded by +¼ wavelength) are incident on the area 193d and retarded by −¼ wavelength. The stray beams of the $-1^{st}$ order beams transmitted through the area 192e ($-1^{st}$ order beams retarded by −¼ wavelength) are incident on the area 193e and retarded by +¼ wavelength. The stray beams of the $-1^{st}$ order beams transmitted through the area 192f ($-1^{st}$ order beams retarded by +¼ wavelength) are incident on the area 193f and retarded by −¼ wavelength. Accordingly, the plural stray beams all remain S polarized beams.

The bundle of rays from the polarization converting optical element 193 is incident on the analyzer 64. Since the analyzer 64 only allows P polarized beams to transmit therethrough, only the plural signal beams are incident on the condenser lens 58 and received by the photo-detector PD. Each light receiving element (light receiving area) of the photo-detector PD performs photo-electric conversion and outputs photo-electric conversion signals to the reproduction signal process circuit 28. Since only plural signal beams are received at the photo-detector PD, photo-electric conversion signals having high S/N ratio can be output.

Figure 8A:
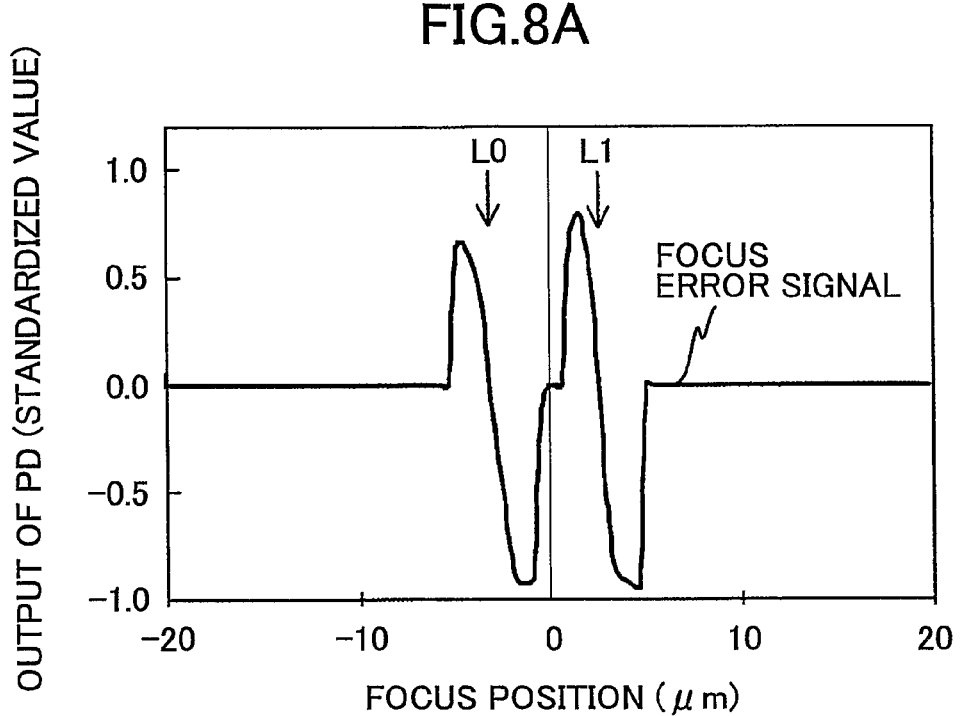
FIGS. 8A and 8B are graphs for describing focus error signals and sum signals obtained at a reproduction signal process circuit shown in FIG. 1 according to an embodiment of the present invention.

Next, returning to FIG. 1, the reproduction signal process circuit 28 according to an embodiment of the present invention obtains, for example, servo signals (including, for example, focus error signals and track error signals), address information, synchronization information, and RF signals based on signals (photo-electric conversion signals) output from the photo-detector PD. Since the photo-electric conversion signals output from the photo-detector PD have a high S/N ratio, the reproduction signal process circuit 28 can accurately obtain servo signals, address information, synchronization information (synchronization signals), and RF signals. For example, as shown in FIG. 8A, the linear portion of the focus error signal is longer compared to that of a conventional example (shown in FIG. 9A). This allows the amount of deviation (positional deviation) of focus to be accurately detected. The vertical axis in FIG. 8A is standardized. For example, in a case where the photo-detector PD is split into two light receiving areas (light receiving elements) by a dividing line extending in a direction corresponding to the tracking direction, the vertical axis of FIG. 8A is expressed as (S1−

Figure 8B:
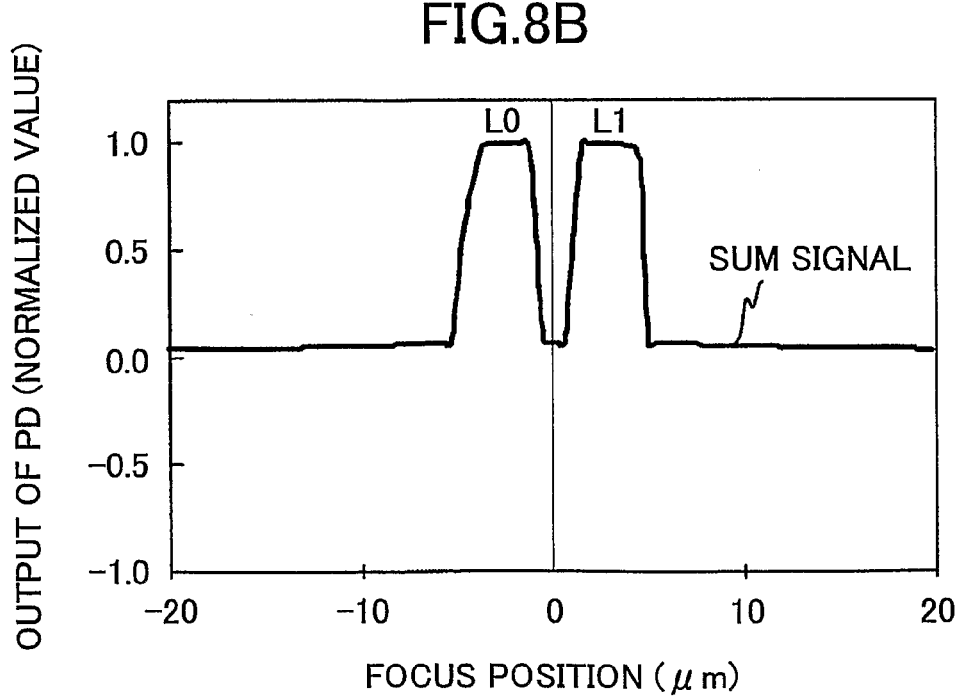
Figure 9A:
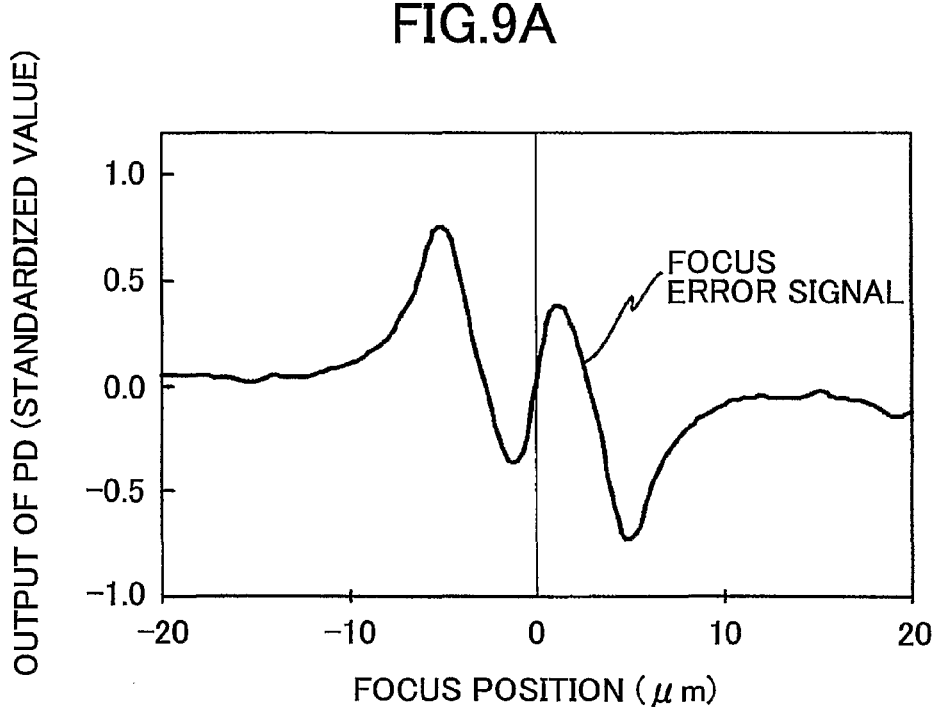
FIGS. 9A and 9B are graphs for describing focus error signals and sum signals obtained by a conventional example.
Figure 9B:
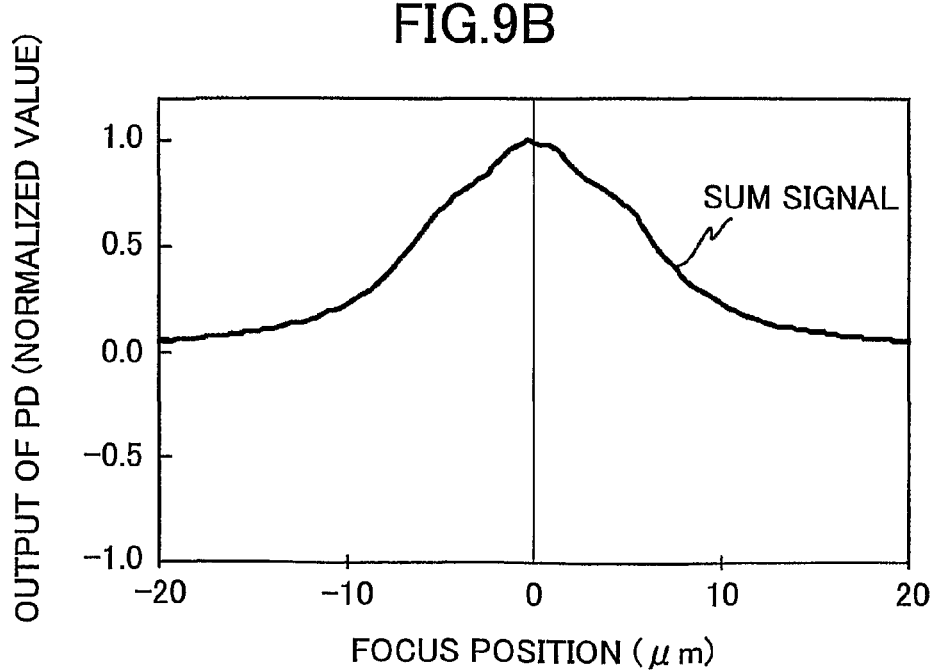

S2)/(S1+S2) wherein the signals output from the respective divided areas are S1, S2. Furthermore, as shown in FIG. 8B, the sum signal (sum of adding the photo-electric conversion signals) including the RF signals is also stable compared to that of the conventional example (shown in FIG. 9B), the RF signals can be accurately obtained. The vertical axis in FIG. 8B is normalized, in which the maximum value of the sum signal is set as 1. FIGS. 8A and 8B are based on data in a case where the thickness of the intermediate layer ML is approximately 9 μm, the NA (numerical aperture) of the objective lens is approximately 0.65, and the wavelength of the laser beam is approximately 660 nm.

Figure 10:
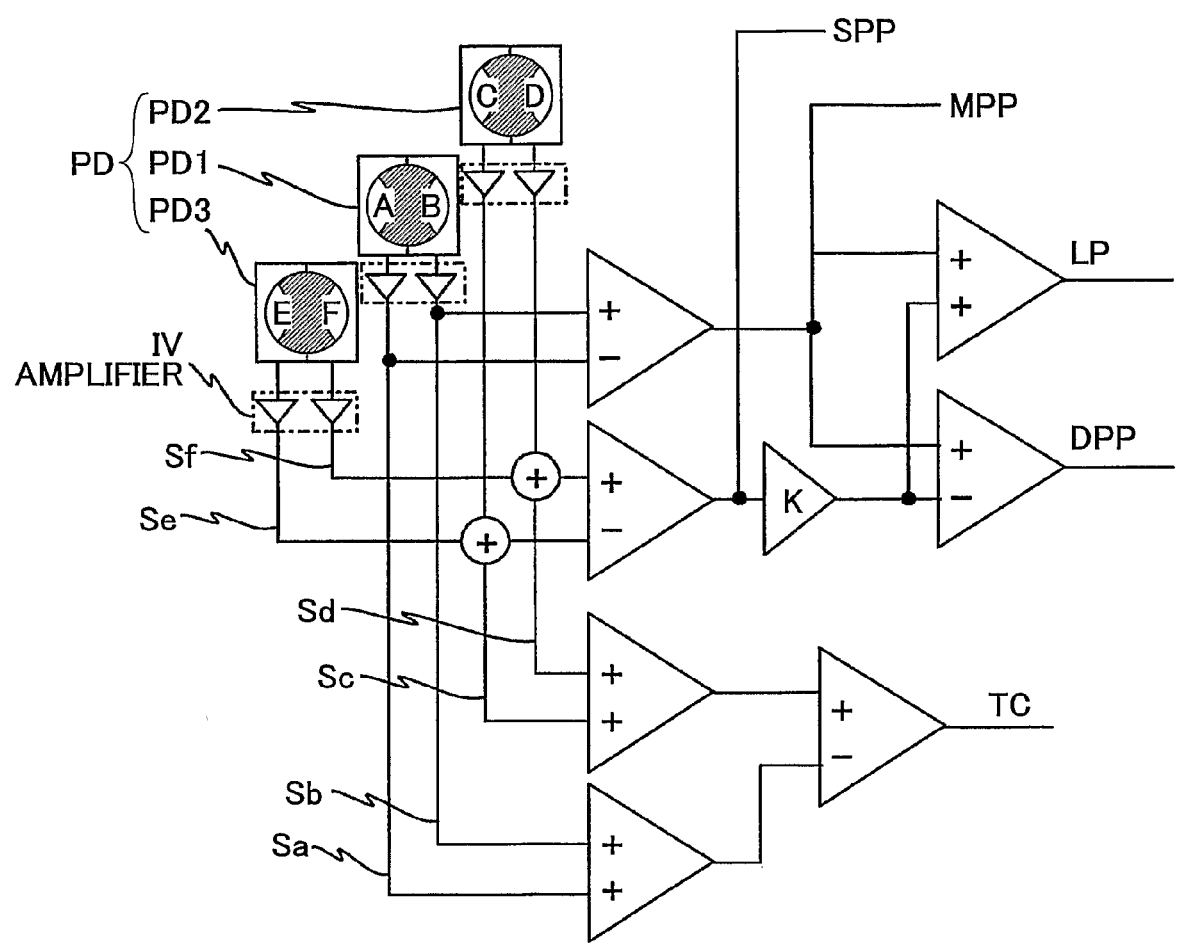
FIG. 10 is a schematic diagram for describing a circuit configuration for obtaining differential push-pull signals according to an embodiment of the present invention.

Furthermore, as shown in FIG. 10, a differential push-pull signal DPP can be obtained with the expression (Sb−Sa)−K (Sd+Sf−Sc−Se) in a case where the photo-detector PD includes a half-split light receiving element PD1 for receiving $0^{th}$ order beams, a half-split light receiving element PD2 for receiving $+1^{st}$ order beams, and a half-split light receiving element PD3 for receiving $-1^{st}$ order beams.

Returning to FIG. 1, the reproduction signal process circuit 28 outputs various obtained signals and data to corresponding parts of the optical disc apparatus 20. That is, the obtained servo signals are output to the drive control circuit 26, the obtained address information is output to the CPU 40, and the synchronization signals are output to the encoder 25 or the drive control circuit 26, for example. Furthermore, the reproduction signal process circuit 28 performs a decoding process and an error detection process on the RF signals. In a case where an error is detected, an error correction process is performed on the RF signals. Then, the corrected signals are stored as reproduction data in the buffer RAM 34 via the buffer manager 37. The address information included in the reproduction data are output to the CPU 40.

The drive control circuit 26 generates drive signals of the tracking actuator for correcting the positional deviation of the objective lens 60 with respect to the tracking direction based on the track error signals from the reproduction signal process circuit 28. Furthermore, the drive control circuit 26 generates drive signals of the focusing actuator AC for correcting focus deviation of the objective lens 60 based on the focus error signals from the reproduction signal process circuit 28. The drive signals of each of the actuators are output to the optical pickup apparatus 23. Thereby, tracking control and focus control is performed. Furthermore, the drive control circuit 26 generates drive signals for driving the seek motor 21 and drive signals for driving the spindle motor 22 based on the instructions from the CPU 40. The drive signals of each of the motors are output to the seek motor 21 and the spindle motor 22, respectively.

The buffer RAM 34 temporarily stores data to be recorded in the optical disc 15 (recording data) and data to be reproduced from the optical disc 15 (reproduction data). The buffer manager 37 manages the input/output of data to the buffer RAM 34.

The encoder 25 extracts recording data stored in the buffer RAM 34 via the buffer manager 37 based on the instructions from the CPU 40. The encoder 25 performs data modulation and addition of error correction codes on the extracted recording data, to thereby generate signals (write signals) for writing the data onto the optical disc 15. The generated write signals are output to the laser control circuit 24.

The laser control circuit 24 controls the irradiation power of the semiconductor laser. For example, in recording data in the optical disc 15, the laser control circuit 24 generates drive signals for driving a semiconductor laser based on write signals, recording conditions, and the irradiation characteristics of the semiconductor laser.

The interface 38 serves as an interface for performing bi-directional communication with an upper apparatus (or a host) 90 such as a personal computer. The interface 38 complies with interface standards such as ATAPI (AT Attachment Packet Interface), SCSI (Small Computer System Interface), and USB (Universal Serial Bus).

The flash memory 39 stores, for example, various programs written in a code readable for the CPU 40, recording conditions (e.g. recording power, recording strategy information) and irradiation characteristics of the semiconductor laser.

The CPU 40 controls various parts in accordance with the various programs stored in the flash memory 39, and stores data used for the control in the RAM 41 and the buffer RAM 34.

Figure 11:
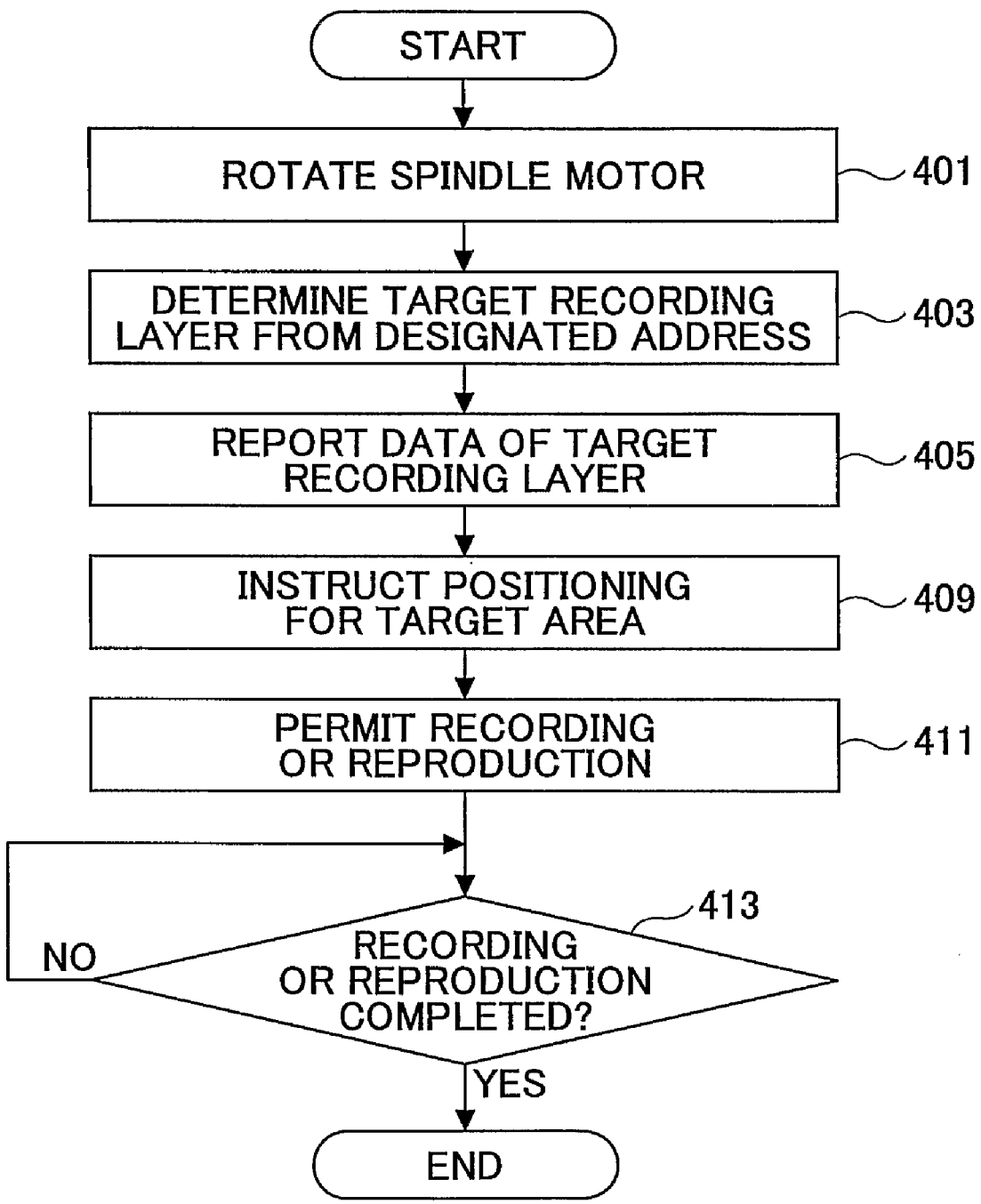
FIG. 11 is a flowchart for describing an operation of an optical disc apparatus according to an embodiment of the present invention in a case where the optical disc apparatus receives an access request from an upper apparatus.

Next, with reference to FIG. 11, an operation of the optical disc apparatus 20 according to an embodiment of the present invention is described in a case where the optical disc apparatus 20 receives an access request from the upper apparatus 90.

The flowchart of FIG. 11 shows an algorithm including a series of steps executed by the CPU 40.

Upon receiving a recording command or a reproduction command from the upper apparatus 90 (hereinafter also referred to as "command"), the operation of the CPU 40 is started by setting a header address of the program corresponding to the flowchart shown in FIG. 11 in a program counter of the CPU 40.

In Step S401, the CPU 40 instructs the drive control circuit 26 to rotate the optical disc 15 at a predetermined linear (or angular speed). The CPU 40 also reports the reception of the command from the upper apparatus 90 to the reproduction signal process circuit 28.

Then, in Step S403, the CPU 40 extracts a designated address from the command, and identifies the target recording layer (determines whether it is the first recording layer L0 or the second recording layer L1) based on the designated address.

Then, in Step S405, the CPU 40 reports information regarding the identified target recording layer to, for example, the drive control circuit 26.

Then, in Step S409, the CPU 40 instructs the drive control circuit 26 to form a beam spot in the vicinity of a target area corresponding to the designated address. Thereby, the seek operation is executed. If it is unnecessary to execute the seek operation, the processes in Step S409 may be skipped.

Then, in Step S411, the CPU 40 allows recording of data or reproduction of data in accordance with the command.

Then, in Step S413, the CPU 40 determines whether the recording process or the reproduction process is completed. If the recording process or the reproduction process is not completed, the CPU 40 determines that the completion of the recording process or the reproduction process as negative and reattempts the determination after a predetermined time elapses. If the recording process or the reproduction process is completed, the CPU 40 determines that the completion of the recording process or the reproduction process as affirmative, to thereby end the operation.

Thus, as described above, the optical pickup apparatus 23 according to an embodiment of the present invention provides a light source 51 for irradiating a linearly polarized beam, a grating 200 for diffracting the linearly polarized beam irradiated from the light source 51 to plural bundles of rays, an objective lens 60 for condensing the plural bundles of rays to a target recording layer included in the plural recording layers of the optical disc 15, a ¼ wave-plate 55 situated on an optical path between the grating 200 and the objective lens 60 for adding an optical phase difference of ¼ wavelength to incident bundle of rays, the optical system 70 situated on an optical path of the bundle of rays reflected from the optical disc 15 and transmitted through the objective lens 60 and the ¼ wave-plate 55, and a photo-detector PD for receiving the bundle of rays from the optical system 70 and generating signals according to the amount of light of the received bundle of rays.

Furthermore, as described above, the optical system 70 provides a polarization beam splitter 54 situated on an optical path of the reflected bundle of rays for splitting the reflected bundle of rays, a lens 61 situated in back of the polarization beam splitter 54 for condensing the reflected bundle of rays, a polarization converting optical element 192 situated between a first imaginary plane and a second imaginary plane, the first imaginary plane including condensing areas at which the plural signal beams are condensed by the lens 61, the second imaginary plane including condensing areas at which the plural stray beams are condensed by the lens 61, the polarization converting optical element 192 having plural divided areas for dividing the plural signal beams and the plural stray beams into two bundle of rays and converting polarization of the divided bundle of rays so that one of the divided bundle of rays has a polarization different from the other divided bundle of rays, another polarization converting optical element 193 situated between the first imaginary plane and a third imaginary plane located farther from the lens 61 than the first imaginary plane, the third imaginary plane including condensing areas at which the plural stray beams are condensed, the polarization converting optical element 193 having plural divided areas facing the plural divided areas of the polarization converting optical element 192 for converting the polarization of the plural signal beams and the plural stray beams transmitted through the polarization converting optical element 192 so that the plural signal beams has a polarization different from the plural stray beams, and an analyzer 64 for extracting the plural signal beams from the reflected bundle of rays transmitted through the polarization converting optical element 193 based on the difference of polarization.

In the optical disc apparatus 20 according to an embodiment of the present invention, the reproduction signal process circuit 28, the CPU 40, and the program executed by the CPU 40 are included in a process apparatus according to an embodiment of the present invention. Moreover, the processes (steps) executed by the CPU 40 may also be partly or entirely executed using other additional hardware.

With the above-described optical pickup apparatus 23 according to an embodiment of the present invention, the bundle of linearly polarized rays (in this example, P polarized light) irradiated from the light source unit 51 is condensed to form plural fine beam spots on the target recording layer of the optical disc 15 via the coupling lens 52, the grating 200, the polarization beam splitter 54, the ¼ wave plate 55, and the objective lens 60. The reflected bundle of rays (including plural signal lights and plural stray lights) reflected from the optical disc 15 is made into linearly polarized light (in this example, S polarized light) that perpendicularly intersects the direction of the rays irradiated from the light source unit 51 and is incident on the polarization beam splitter 54. The bundle of rays reflected in the −Z direction in the polarization beam splitter 54 becomes converged light at the lens 61 (condensing optical element) and is incident on the polarization converting optical element 192. In the polarization converting optical element 192, the bundle of rays incident on the areas 192a, 192c, and 192e is retarded by −¼ wavelength and the bundle of rays incident on the areas 192b, 192d, and 192f is retarded by +¼ wavelength. The reflected bundle of rays transmitted through the polarization converting optical element 192 is incident on the polarization converting optical element 193. In the polarization converting optical element 193, the bundle of rays incident on the areas 193a, 193c, and 193e is retarded by +¼ wavelength and the bundle of rays incident on the areas 193b, 193d, and 193f is retarded by −¼ wavelength. Accordingly, the plural signal beams transmitted through the polarization converting optical element 193 become P polarized beams and the plural stray beams transmitted through the polarization converting optical element 193 remain S polarized beams. The reflected bundle of rays transmitted through the polarization converting optical element 193 is incident on the analyzer 64. Among the reflected bundle of rays incident on the analyzer 64, only plural signal beams are transmitted through the analyzer 64. That is, the optical system 70 according to an embodiment of the present invention extracts plural signal beams from the reflected bundle of rays including plural signal beams and plural stray beams. The reflected bundle of rays transmitted through the analyzer 64 is received by the photo-detector PD via the condenser lens 58. In this case, since only plural signal beams included in the reflected bundle of rays are received at the photo-detector PD, plural photo-electric conversion signals having high S/N ratio can be output. Hence, desired signals can be precisely obtained from an optical disc having plural recording layers.

Furthermore, according to the above-described embodiment of the present invention, the borderline (dividing line), which separates (divides) each polarization converting optical element into an area adding retardation of +¼ wavelength and an area adding retardation of −¼ wavelength, can be oriented in the same direction as the tracking direction. Therefore, even if the objective lens 60 is shifted in the tracking direction, signal beams and stray beams can be precisely separated.

Furthermore, with the optical disc apparatus 20 according to an embodiment of the present invention, photo-electric conversion signals having a high S/N ratio can be output from the optical pickup apparatus 23. Thereby, an optical disc having plural recording layers can be steadily precisely accessed. Hence, information can be precisely reproduced from an optical disc having plural recording layers.

Furthermore, in the polarization converting optical element 192 according to the above-described embodiment of the present invention, each of the areas 192a, 192c, and 192e adds retardation of −¼ wavelength to the incident bundle of rays and each of the areas 192b, 192d, and 192f adds retardation of +¼ wavelength to the incident bundle of rays. Furthermore, in the polarization converting optical element 193 according to the above-described embodiment of the present invention, each of the areas 193a, 193c, and 193e adds retardation of +¼ wavelength to the incident bundle of rays and each of the areas 193b, 193d, and 193f adds retardation of −¼ wavelength to the incident bundle of rays. Alternatively, however, in the polarization converting optical element 192 according to another embodiment of the present invention, each of the areas 192a, 192c, and 192e may add retardation of +¼ wavelength to the incident bundle of rays and each of the areas 192b, 192d, and 192f may add retardation of −¼ wavelength to the incident bundle of rays. Furthermore, in the polarization converting optical element 193 according to the other embodiment of the present invention, each of the areas 193a, 193c, and 193e may add retardation of −¼ wavelength to the incident bundle of rays and each of the areas 193b, 193d, and 193f adds retardation of +¼ wavelength to the incident bundle of rays. In this case, the same as the above-described embodiment of the present invention, only signal beams can be converted to P polarized beams.

In the polarization converting optical element 193 according to the above-described embodiment of the present invention, each of the areas 193a, 193c, and 193e adds retardation of +¼ wavelength to the incident bundle of rays and each of the areas 193b, 193d, and 193f adds retardation of −¼ wavelength to the incident bundle of rays. Alternatively, however, in the polarization converting optical element 193 according to another embodiment of the present invention, each of the areas 193a, 193c, and 193d may add retardation of −¼ wavelength to the incident bundle of rays and each of the areas 193b, 193d, and 193f may add retardation of +¼ wavelength to the incident bundle of rays. In other words, the polarization converting optical elements 192 and 193 can be configured the same. It is, however, to be noted that the analyzer 64 is to allow transmittance of S polarized beams since plural signal beams remain S polarized beams and plural stray beams are converted P polarized beams in this case.

Furthermore, in the polarization converting optical element 192 according to the above-described embodiment of the present invention, each of the areas 192a, 192c, and 192e adds retardation of −¼ wavelength to the incident bundle of rays and each of the areas 192b, 192d, and 192f adds retardation of +¼ wavelength to the incident bundle of rays. Alternatively, however, in the polarization converting optical element 192 according to another embodiment of the present invention, each of the areas 192a, 192c, and 192e may add retardation of +¼ wavelength to the incident bundle of rays and each of the areas 192b, 192d, and 192f may add retardation of −¼ wavelength to the incident bundle of rays. In other words, the polarization converting optical elements 192 and 193 can be configured the same. It is, however, to be noted that the analyzer 64 is to allow transmittance of S polarized beams since plural signal beams remain S polarized beams and plural stray beams are converted P polarized beams in this case.

Figure 12:
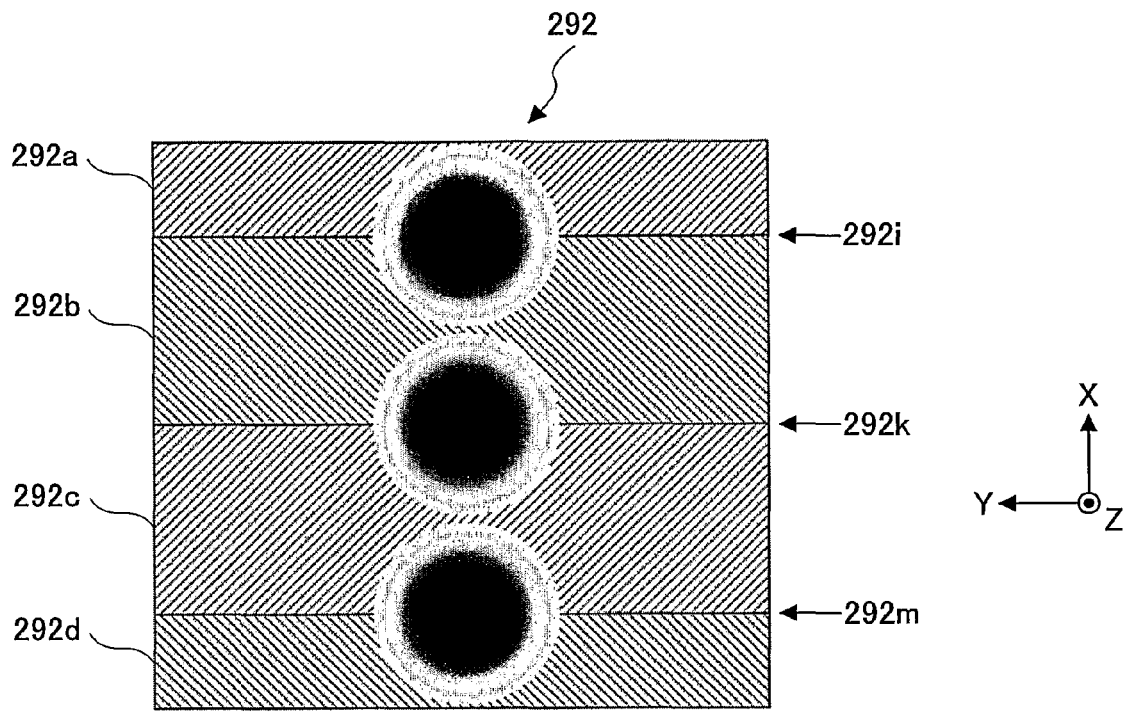
FIG. 12 is a schematic diagram for describing a first modified example of one of the polarization converting optical elements shown in FIG. 3 according to an embodiment of the present invention.

Furthermore, as an alternative to the above-described polarization converting optical element 192, a polarization converting optical element 292 according to an embodiment of the present invention may be divided into four areas (292a, 292b, 292c, 292d) by three dividing lines (292i, 292k, 292m) extending in the Y axis direction (See FIG. 12), so that each of the areas 292a and 292c adds retardation of +¼ wavelength to the incident bundle of rays and each of the areas 292b and 292d adds retardation of −¼ wavelength to the incident bundle of rays. In this case, +1$^{st}$ order beams are incident on the areas 292a and 292b, 0$^{th}$ order beams are incident on the areas 292b and 292c, and −1$^{st}$ order beams are incident on the areas 292c and 292d.

Figure 13:
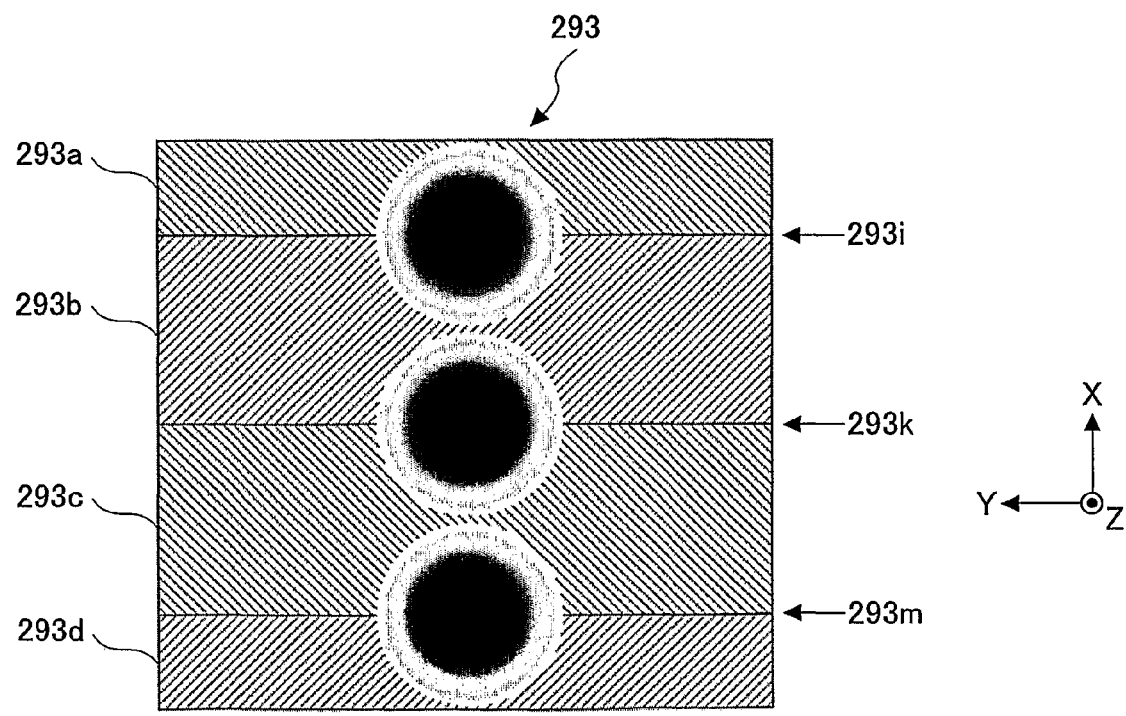
FIG. 13 is a schematic diagram for describing a first modified example of the other polarization converting optical element shown in FIG. 3 according to an embodiment of the present invention.

Likewise, as an alternative of the above-described polarization converting optical element 193, a polarization converting optical element 293 according to an embodiment of the present invention may be divided into four areas (293a, 293b, 293c, 293d) by three dividing lines (293i, 293k, 293m) extending in the Y axis direction (See FIG. 13), so that each of the areas 293a and 293c adds retardation of −¼ wavelength to the incident bundle of rays and each of the areas 293b and 293d adds retardation of +¼ wavelength to the incident bundle of rays. The same as the above-described embodiments of the present invention, only plural signal are converted to P polarized beams.

Accordingly, even if the number of divided areas is reduced and the 0$^{th}$ order beam and the ±1$^{st}$ order beam become closer to each other (smaller interval), plural signal beams can be extracted without reducing the quantity of light.

Figure 14:
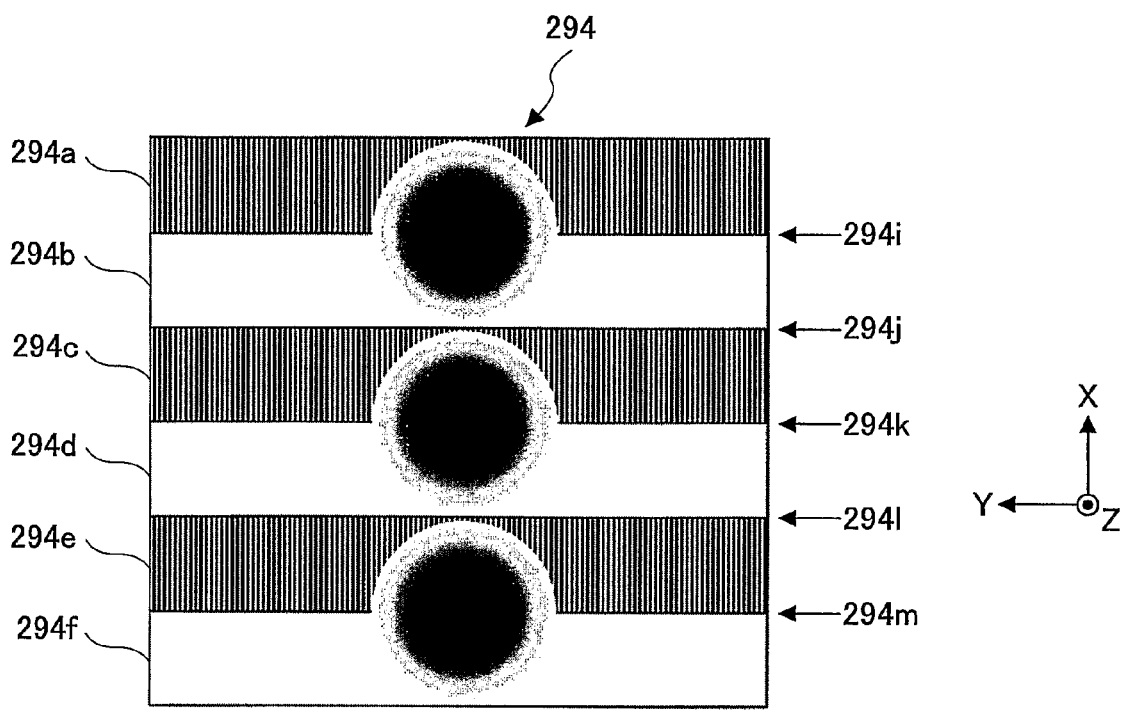
FIG. 14 is a schematic diagram for describing a second modified example of one of the polarization converting optical elements shown in FIG. 3 according to an embodiment of the present invention.

Furthermore, as another alternative of the above-described polarization converting optical element 192, a polarization concerting optical element 294 according to an embodiment of the present invention may be divided into six areas (294a, 294b, 294c, 294d, 294e, 294f) by five dividing lines (294i, 294j, 294k, 294l, 294m) extending in the Y axis direction (See FIG. 14), so that each of the areas 294a, 294c, and 293e adds retardation of ½ wavelength to the incident bundle of rays and each of the areas 294b, 294d, and 294f adds no retardation to the incident bundle of rays. In this case, +1$^{st}$ order beams are incident on the areas 294a and 294b, 0$^{th}$ order beams are incident on the areas 294c and 294d, and −1$^{st}$ order beams are incident on the areas 294e and 294f.

Figure 15:
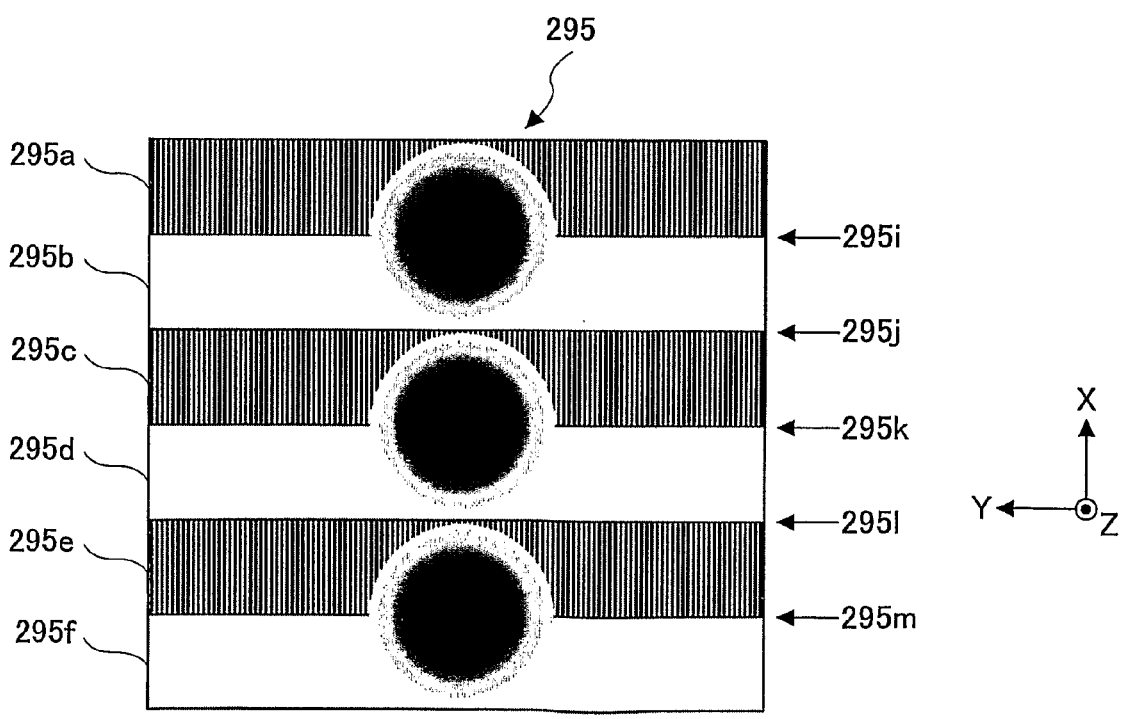
FIG. 15 is a schematic diagram for describing a second modified example of the other polarization converting optical element shown in FIG. 3 according to an embodiment of the present invention.

Likewise, as another alternative of the above-described polarization converting optical element 193, a polarization concerting optical element 295 according to an embodiment of the present invention may be divided into six areas (295a, 295b, 295c, 295d, 295e, 295f) by five dividing lines (295i, 295j, 295k, 295l, 295m) extending in the Y axis direction (See FIG. 15), so that each of the areas 295a, 295c, and 295e adds retardation of ½ wavelength to the incident bundle of rays and each of the areas 295b, 295d, and 295f adds no retardation to the incident bundle of rays. The same as the above-described embodiments of the present invention, only plural signal are converted to P polarized beams.

Accordingly, each of the polarization converting optical elements can have a simplified divided structure, to thereby obtain a polarization converting element of high productivity. Particularly, in a manufacturing process in this case, the polarization converting optical element 294 can be fabricated by dividing a single waveplate capable of adding retardation of ½ wavelength into six areas and removing (e.g., etching) the surface corresponding to the areas 294b, 294d, and 294f for eliminating the retarding effects of the areas 294b, 294d, and 294f. Likewise, the polarization converting optical element 294 can be fabricated by dividing a single waveplate capable of adding retardation of ½ wavelength into six areas and removing (e.g., etching) the surface corresponding to the areas 295b, 295d, and 295f for eliminating the retarding effects of the areas 295b, 295d, and 295f.

Figure 16:
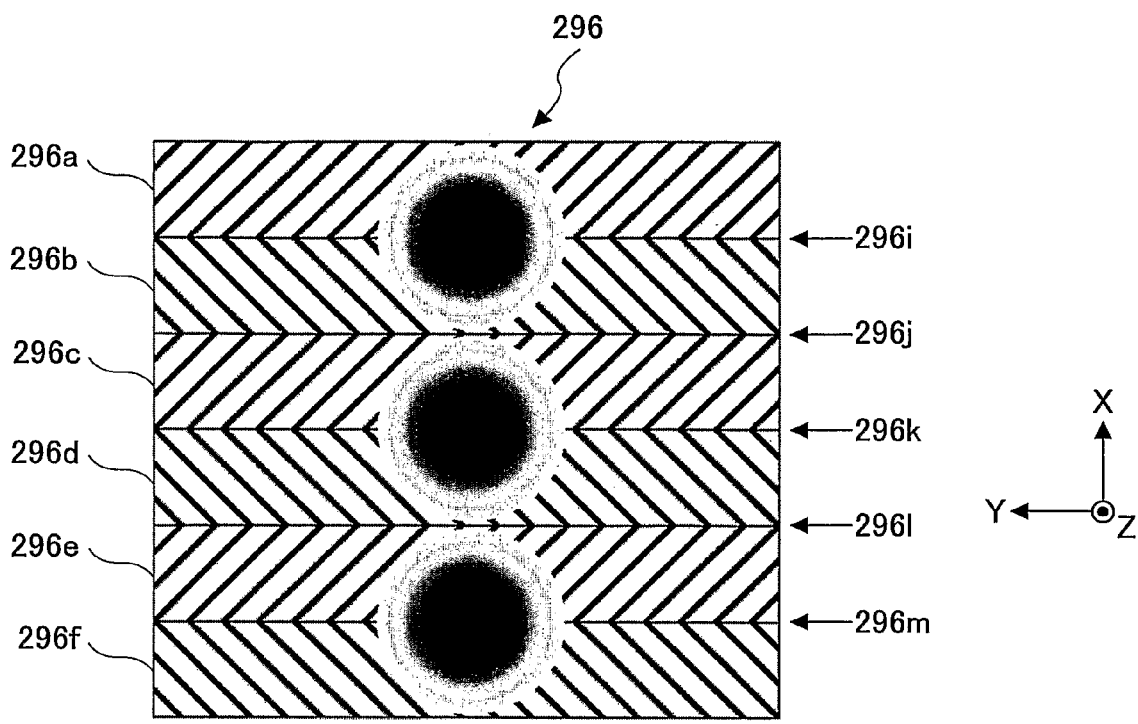
FIG. 16 is a schematic diagram for describing a third modified example of one of the polarization converting optical elements shown in FIG. 3 according to an embodiment of the present invention.

Furthermore, as yet another alternative of the above-described polarization converting optical element 192, a polarization concerting optical element 296 according to an embodiment of the present invention may be divided into six areas (296a, 296b, 296c, 296d, 296e, 296f) by five dividing lines (296i, 296j, 296k, 296l, 296m) extending in the Y axis direction (See FIG. 16), so that each of the areas 296a, 296c, and 296e rotates the polarization (vibration) of the incident bundle of rays +45 degrees and each of the areas 296b, 296d, and 296f rotates the polarization (vibration) of the incident bundle of rays −45 degrees. In this case, +1$^{st}$ order beams are incident on the areas 296a and 296b, 0$^{th}$ order beams are incident on the areas 296c and 296d, and −1$^{st}$ order beams are incident on the areas 296e and 296f.

Figure 17:
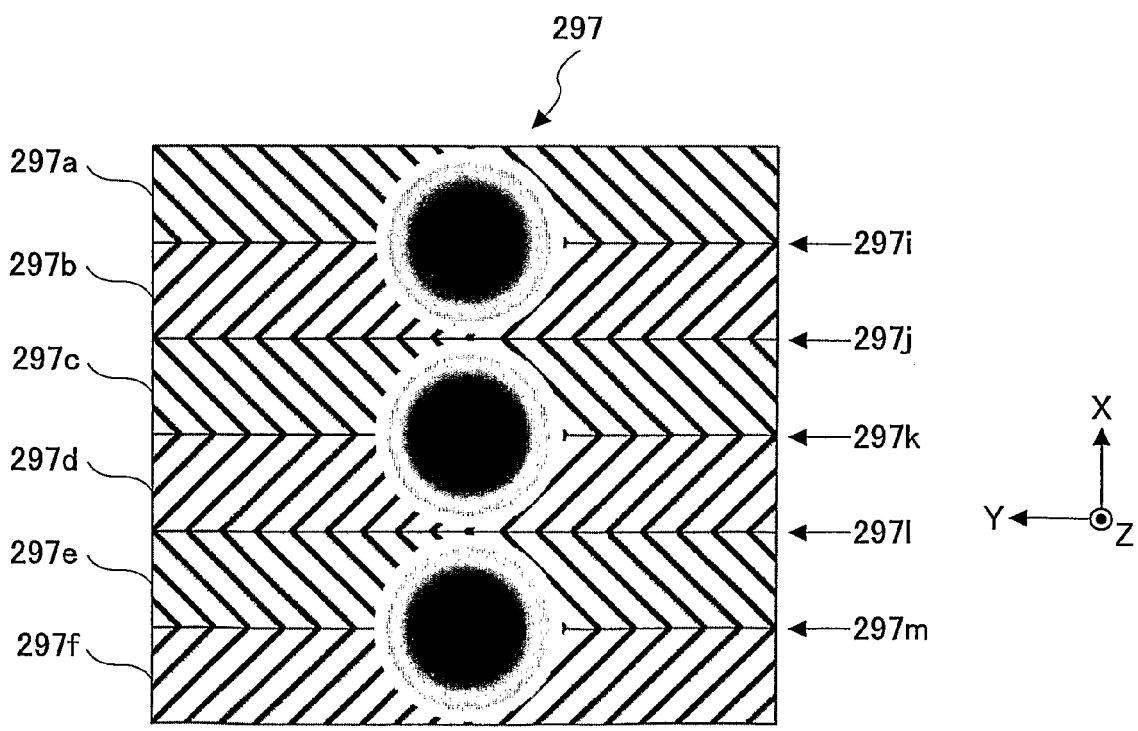
FIG. 17 is a schematic diagram for describing a third modified example of the other polarization converting optical element shown in FIG. 3 according to an embodiment of the present invention.

Likewise, as another alternative of the above-described polarization converting optical element 193, a polarization concerting optical element 297 according to an embodiment of the present invention may be divided into six areas (297a, 297b, 297c, 297d, 297e, 297f) by five dividing lines (297i, 297j, 297k, 297l, 297m) extending in the Y axis direction (See FIG. 17), so that each of the areas 297a, 297c, and 297e rotates the polarization (vibration) of the incident bundle of rays −45 degrees and each of the areas 297b, 297d, and 297f rotates the polarization (vibration) of the incident bundle of rays +45 degrees. The same as the above-described embodiments of the present invention, only plural signals are converted to P polarized beams.

Figure 18:
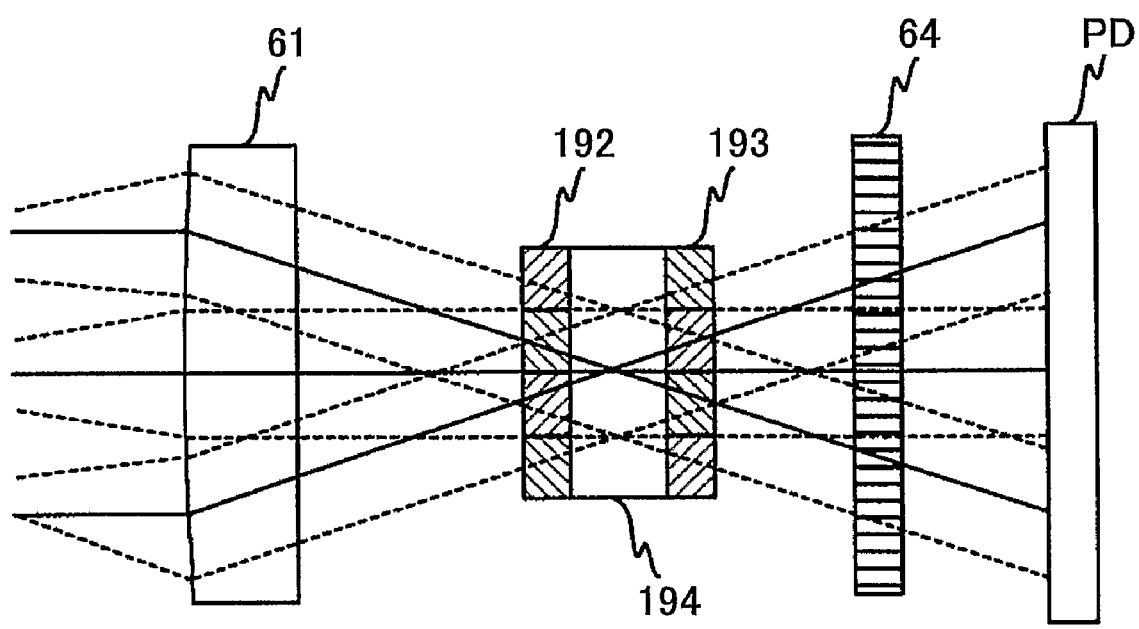
FIG. 18 is a schematic diagram for describing a modified example of the optical system shown in FIG. 3 according to an embodiment of the present invention.

As described above, as yet another alternative, the polarization converting optical element 192 and the polarization converting optical element 193 may be combined into a united body via a transparent material having refractivity (index of refraction) greater than 1 (see FIG. 18). This allows the positions of the polarization converting optical element 192 and the polarization converting optical element 193 to be defined more easily. Thus, the dividing lines (192i, 192j, 192k, 192l, 192m) of the polarization converting optical element 192 and the dividing lines (193i, 193j, 193k, 193l, 193m) of the polarization converting optical element 193 can easily be positioned facing each other during a manufacturing process, to thereby simplify assembly procedures (steps) and adjustment procedures (steps). Since the polarization converting optical element 192 and the polarization converting optical element 193 are fabricated so that each area (192a, 192b, 192c, 192d, 192e, 192f) of the polarization converting optical element 192 and each area (193a, 193b, 193c, 192d, 192e, 192f) of the polarization converting optical element 193 are appropriately positioned on the transparent material 194, it is preferable to use a sub-wavelength grating or a photonic crystal as the transparent material 194.

Although the condensing optical element according to the above-described embodiment of the present invention is explained as being positioned behind (after) the polarizer, the condensing optical element may be positioned in front of (before) the polarizer.

Figure 19:
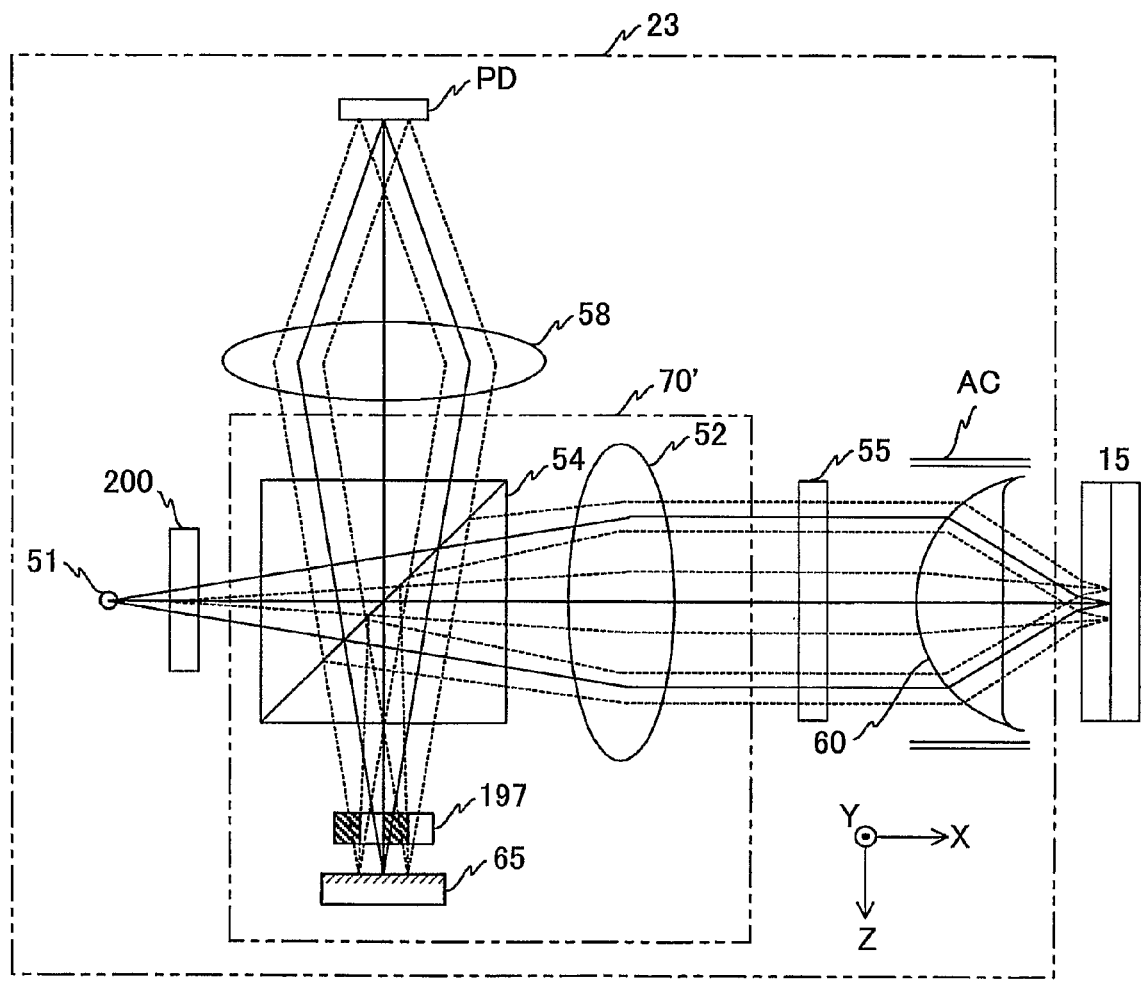
FIG. 19 is a schematic diagram for describing a modified example of the optical pickup apparatus shown in FIG. 1 according to an embodiment of the present invention.

Furthermore, in the optical pickup apparatus 23 according to another embodiment of the present invention, the lens 58 and the photo-detector PD may be positioned on the –Z side of the polarization beam splitter 54 while a polarization converting optical element 197 and a mirror 65 are used (positioned on the +Z side of the polarization beam splitter 54) instead of using the above-described polarization converting optical element 192, the polarization converting optical element 193, and the analyzer 64 (See FIG. 19). Furthermore, since the coupling lens 52 can serve as the condensing optical element, the above-described lens 61 would not be required in this embodiment of the present invention. Thus, an optical system according to this embodiment of the present invention comprises the polarization beam splitter 54, the coupling lens 52, the polarization converting optical element 197, and the mirror 65.

Figure 20:
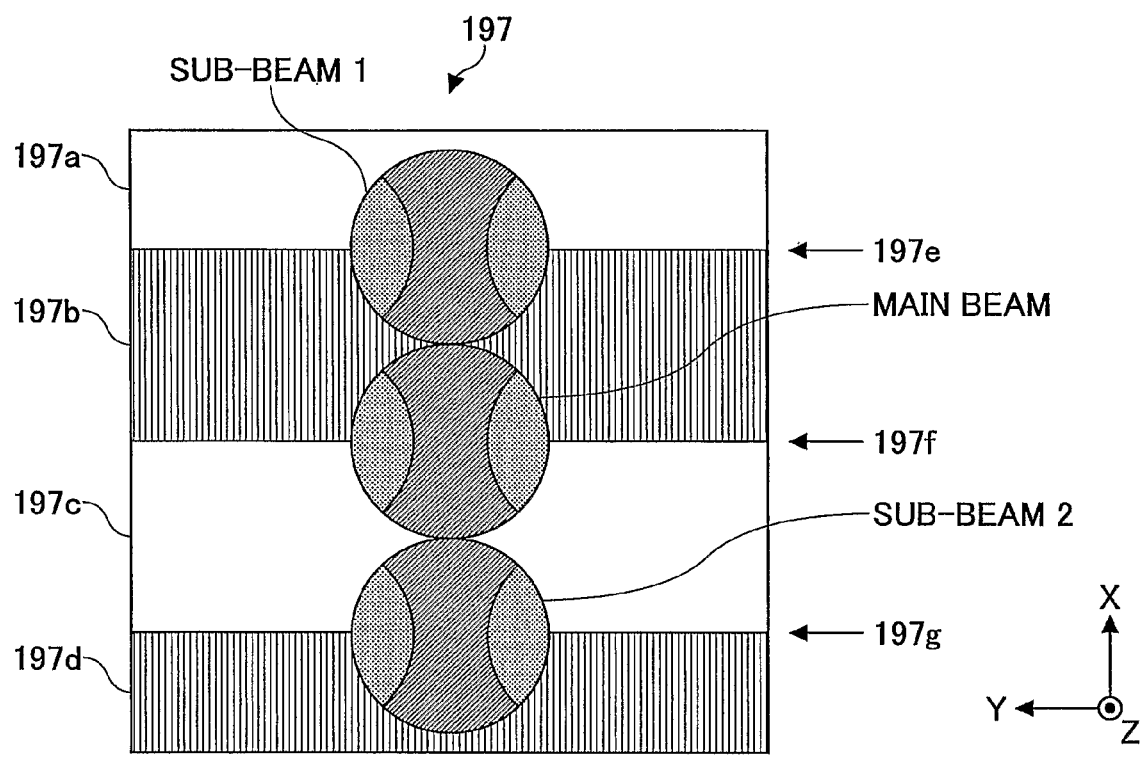
FIG. 20 is a schematic diagram for describing a polarization converting optical element shown in FIG. 19 according to an embodiment of the present invention.

The polarization converting optical element 197 is located on the +Z side of the polarization beam splitter and interposed between the condensing plane of plural signal beams and the condensing plane of plural stray beams situated on the –Z side of the condensing plane of the plural signal beams. As shown in FIG. 20, the polarization converting optical element 197 may be divided into, for example, four areas (197a, 197b, 197c, 197d) by three dividing lines (197e, 197f, 197g) extending in the Y axis direction. In this example, each dividing line splits the plural signal beams into two at their corresponding optical axes. Each of the areas 197a and 197c adds no retardation to the incident bundle of rays and each of the areas 197b and 197d adds retardation of ½ wavelength to the incident bundle of rays. In other words, the areas 197a-197d are provided in a stripe-like configuration having the optical axis of each bundle of rays as a border such that an area adding ½ wavelength and an area adding no retardation are alternately arranged. It is to be noted that, when the objective lens 60 shifts in the tracking direction, the reflected bundle of rays incident on the polarization converting optical element 197 shifts in a direction corresponding to the tracking direction (in this example, Y axis direction). In this case, +1$^{st}$ order beams of the signal and stray beams are incident on the areas 197a and 197b, 0$^{th}$ order beams of the signal and stray beams are incident on the areas 197b and 197c, and –1$^{st}$ order beams of the signal and stray beams are incident on the areas 197c and 197d.

For example, a twisted nematic liquid crystal, a sub-wavelength wire-grid, or a photonic crystal may be used for forming the areas 197b and 197d.

Figure 21:
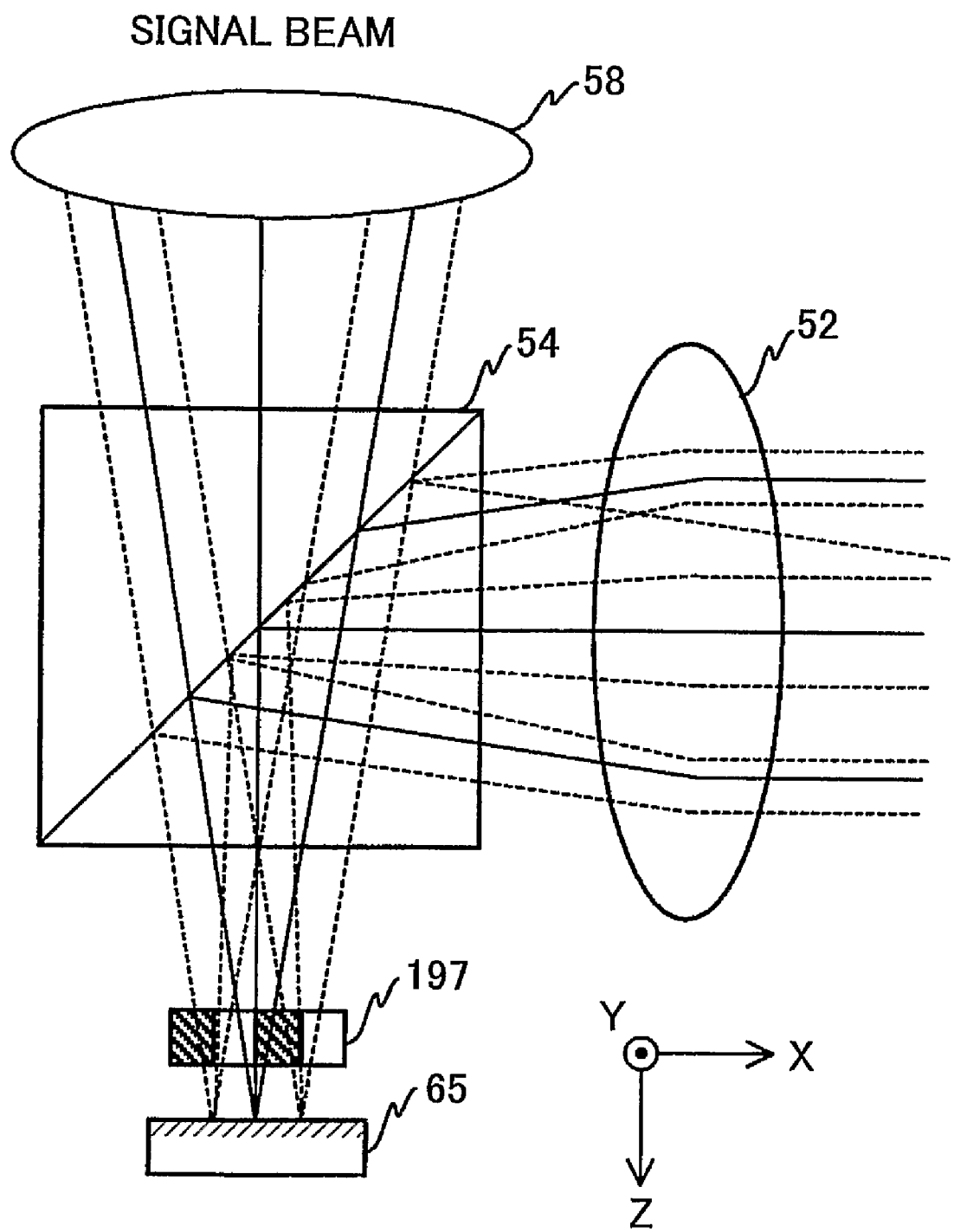
FIG. 21 is a schematic diagram (part 1) for describing operation of the optical system shown in FIG. 19 according to an embodiment of the present invention.

The mirror 65 is situated at the condensing plane of the plural signal beams (see FIG. 21). Accordingly, the mirror 65 reflects the +1st order signal beams transmitted through the area 197a to the area 197b and reflects the +1$^{st}$ order signal beams transmitted through the area 197b to the area 197a. Furthermore, the mirror 65 reflects the 0$^{th}$ order signal beams transmitted through the area 197b to the area 197c and reflects the 0$^{th}$ order signal beams transmitted through the area 197c to the area 197b. Furthermore, the mirror 65 reflects the –1$^{st}$ order beams transmitted through the area 197c to the area 197d and reflects the –1$^{st}$ order signal beams transmitted through the area 197d to the area 197c.

Next, operation of the above-described optical system 70' according to an embodiment of the present invention is described with reference to FIGS. 19-23.

Plural signal beams and plural stray beams reflected from the optical disc 15 are converged to the coupling lens 52 and directed in the +Z direction by the polarization beam splitter 54. In this case, the bundles of rays of the plural signal beams and the plural stray beams are S polarized beams. Then, the plural signal beams and plural stray beams are incident on the polarization converting optical element 197.

[Signal Beam]

In the polarization converting optical element 197, the area 197a adds no retardation to incident +1$^{st}$ order beams of the signal beams and the area 197b adds retardation of ½ to incident +1$^{st}$ order beams of the signal beams. Then, the +1$^{st}$ order beams of the signal beams transmitted through the area 197a are reflected by the mirror 65 to the area 197b and the +1$^{st}$ order beams of the signal beams transmitted through the area 197b are reflected by the mirror 65 to the area 197a. Accordingly, the +1$^{st}$ order beams of the signal beams reflected by the mirror 65 and transmitted again through the polarization converting optical element 197 all have added retardation of ½ wavelength.

Furthermore, in the polarization converting optical element 197, the area 197b adds retardation of ½ wavelength to incident 0$^{th}$ order beams of the signal beams and the area 197c adds no retardation to incident 0$^{th}$ order beams of the signal beams. Then, as shown in FIG. 21, the 0$^{th}$ order beams of the signal beams transmitted through the area 197c are reflected by the mirror 65 to the area 197c and the 0$^{th}$ order beams of the signal beams transmitted through the area 197c are reflected by the mirror 65 to the area 197b. Accordingly, the 0$^{th}$ order beams of the signal beams reflected by the mirror 65 and transmitted again through the polarization converting optical element 197 all have added retardation of ½ wavelength.

Furthermore, in the polarization converting optical element 197, the area 197c adds no retardation to incident –1$^{st}$ order beams of the signal beams and the area 197d adds retardation of ½ to incident –1$^{st}$ order beams of the signal beams. Then, the –1$^{st}$ order beams of the signal beams transmitted through the area 197c are reflected by the mirror 65 to the area 197d and the –1$^{st}$ order beams of the signal beams transmitted through the area 197d are reflected by the mirror 65 to the area 197c. Accordingly, the –1$^{st}$ order beams of the signal beams reflected by the mirror 65 and transmitted again through the polarization converting optical element 197 all have added retardation of ½ wavelength.

Thereby, the plural signal beams all become P polarized beams.

[Stray Beams]

1. In a case where stray beams are reflected from a recording layer located toward the +X side of the target recording layer]

Figure 22:
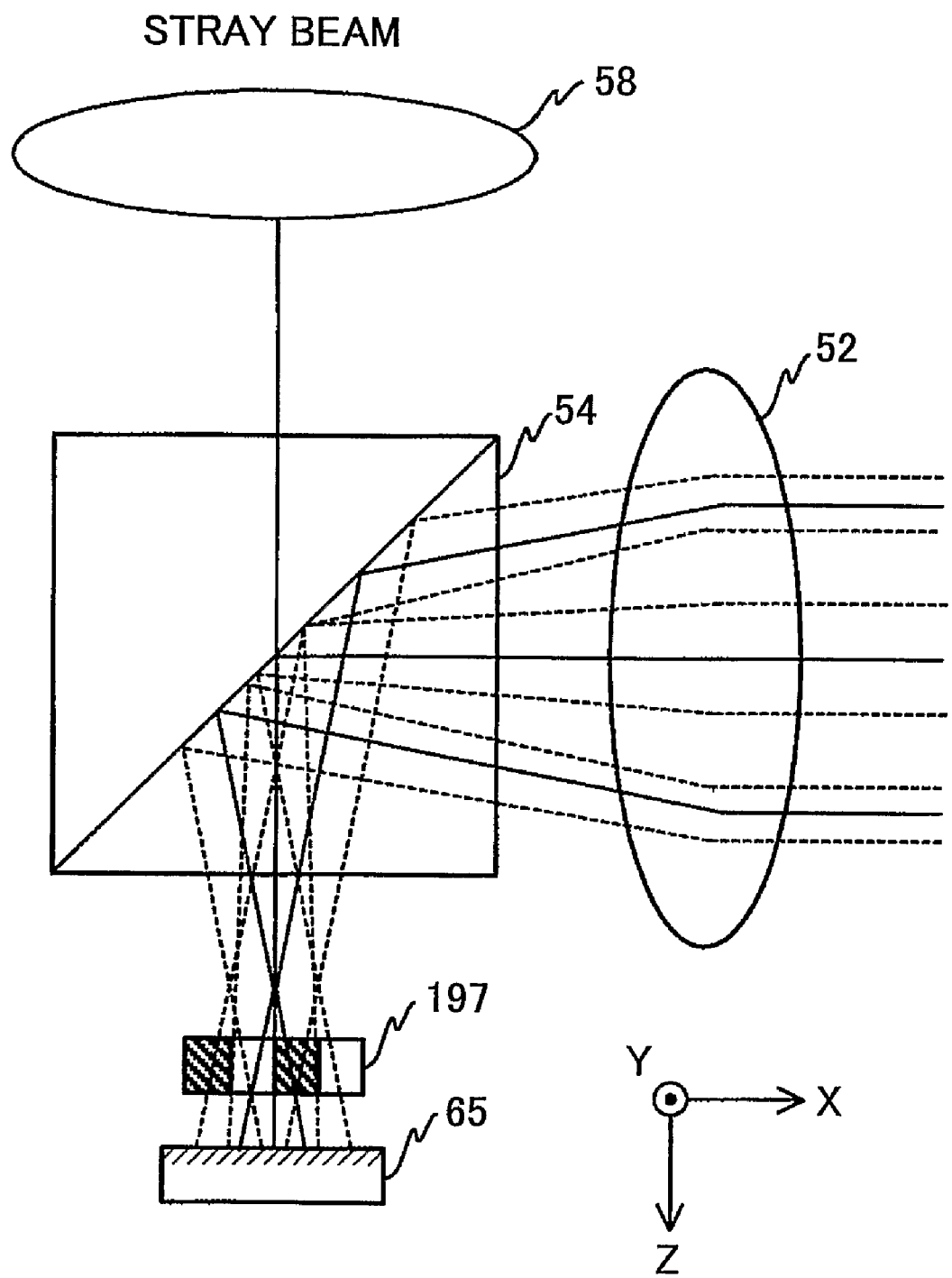
FIG. 22 is a schematic diagram (part 2) for describing operation of the optical system shown in FIG. 19 according to an embodiment of the present invention.

As shown in FIG. 22, plural stray beams reflected from a recording layer located toward the +X side of the target recording layer are condensed between the polarization beam splitter 54 and the polarization converting optical element 197 and then directed incident onto the polarization converting optical element 197.

In the polarization converting optical element 197, the area 197a adds no retardation to incident $+1^{st}$ order beams of the stray beams and the area 197b adds retardation of ½ to incident $+1^{st}$ order beams of the stray beams. Then, the $+1^{st}$ order beams of the stray beams transmitted through the area 197a are reflected by the mirror 65 to the area 197a and the $+1^{st}$ order beams of the signal beams transmitted through the area 197b are reflected by the mirror 65 to the area 197b (See FIG. 22). Accordingly, the $+1^{st}$ order beams of the stray beams reflected by the mirror 65 and transmitted again through the polarization converting optical element 197 do not have retardation added.

Furthermore, in the polarization converting optical element 197, the area 197b adds retardation of ½ wavelength to incident $0^{th}$ order beams of the stray beams and the area 197c adds no retardation to incident $0^{th}$ order beams of the stray beams. Then, the $0^{th}$ order beams of the stray beams transmitted through the area 197b are reflected by the mirror 65 to the area 197b and the $0^{th}$ order beams of the signal beams transmitted through the area 197c are reflected by the mirror 65 to the area 197c (See FIG. 22). Accordingly, the $0^{th}$ order beams of the stray beams reflected by the mirror 65 and transmitted again through the polarization converting optical element 197 do not have retardation added.

Furthermore, in the polarization converting optical element 197, the area 197c adds no retardation to incident $-1^{st}$ order beams of the stray beams and the area 197d adds retardation of ½ to incident $-1^{st}$ order beams of the stray beams. Then, the $-1^{st}$ order beams of the stray beams transmitted through the area 197c are reflected by the mirror 65 to the area 197c and the $-1^{st}$ order beams of the stray beams transmitted through the area 197d are reflected by the mirror 65 to the area 197c. Accordingly, the $-1^{st}$ order beams of the stray beams reflected by the mirror 65 and transmitted again through the polarization converting optical element 197 do not have retardation added.

Thereby, the plural stray beams reflected from a recording layer located toward the +X side of the target recording layer all remain S polarized beams.

2. In a case where stray beams are reflected from a recording layer located toward the −X side of the target recording layer]

Figure 23:
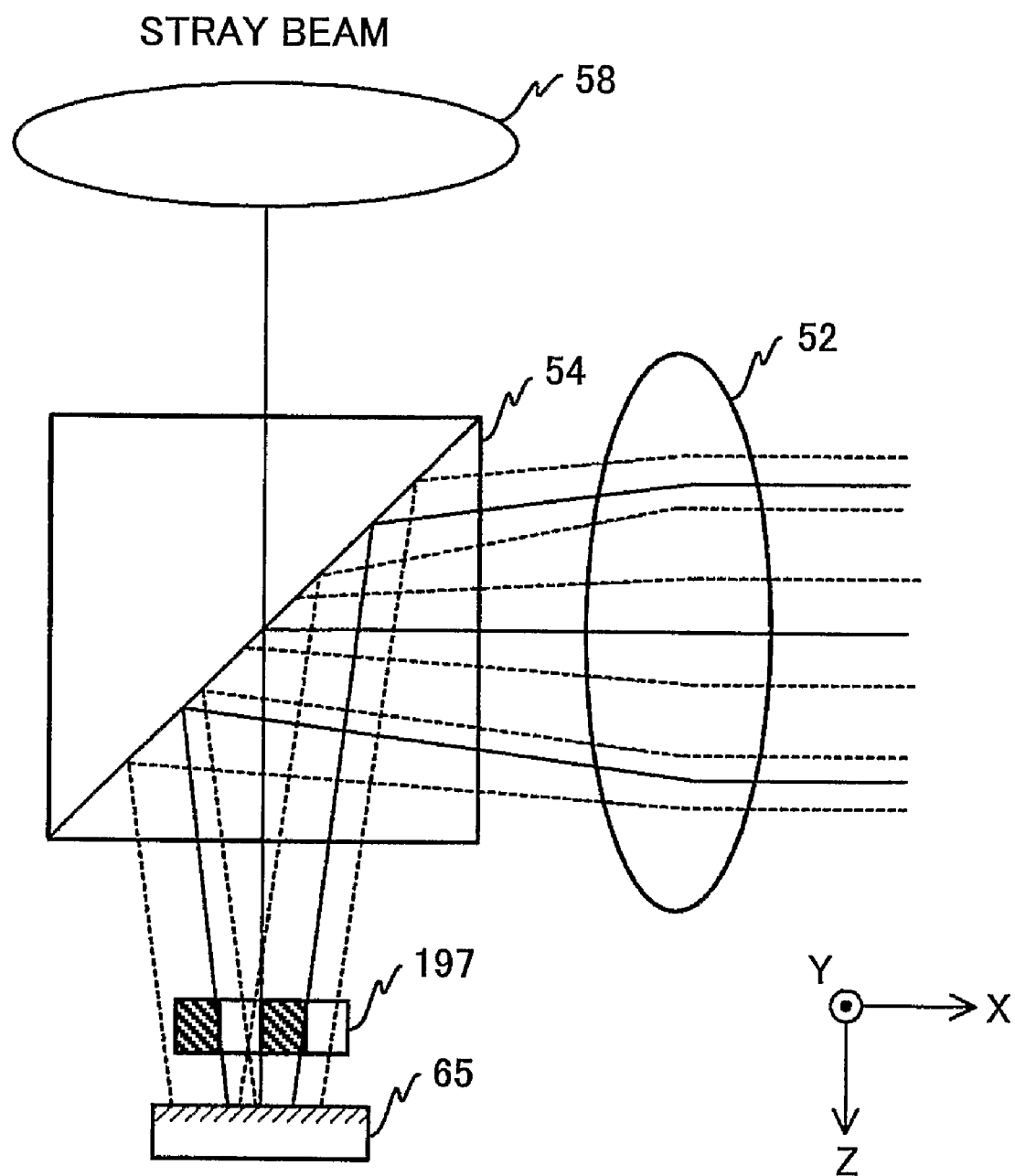
FIG. 23 is a schematic diagram (part 3) for describing operation of the optical system shown in FIG. 19 according to an embodiment of the present invention.

As shown in FIG. 23, plural stray beams reflected from a recording layer located toward the −X side of the target recording layer are transmitted through the polarization converting optical element 197 and reach the mirror 65 before condensing. Then, the plural stray beams reflected by the mirror 65 are condensed after transmitting again through the polarization converting optical element 197.

In the polarization converting optical element 197, the area 197a adds no retardation to incident $+1^{st}$ order beams of the stray beams and the area 197b adds retardation of ½ to incident $+1^{st}$ order beams of the stray beams. Then, the $+1^{st}$ order beams of the stray beams transmitted through the area 197a are reflected by the mirror 65 to the area 197a and the $+1^{st}$ order beams of the signal beams transmitted through the area 197b are reflected by the mirror 65 to the area 197b (See FIG. 23). Accordingly, the $+1^{st}$ order beams of the stray beams reflected by the mirror 65 and transmitted again through the polarization converting optical element 197 do not have retardation added.

Furthermore, in the polarization converting optical element 197, the area 197b adds retardation of ½ wavelength to incident $0^{th}$ order beams of the stray beams and the area 197c adds no retardation to incident $0^{th}$ order beams of the stray beams. Then, the $0^{th}$ order beams of the stray beams transmitted through the area 197b are reflected by the mirror 65 to the area 197b and the $0^{th}$ order beams of the signal beams transmitted through the area 197c are reflected by the mirror 65 to the area 197c (See FIG. 23). Accordingly, the $0^{th}$ order beams of the stray beams reflected by the mirror 65 and transmitted again through the polarization converting optical element 197 do not have retardation added.

Furthermore, in the polarization converting optical element 197, the area 197c adds no retardation to incident $-1^{st}$ order beams of the stray beams and the area 197d adds retardation of ½ to incident $-1^{st}$ order beams of the stray beams. Then, the $-1^{st}$ order beams of the stray beams transmitted through the area 197c are reflected by the mirror 65 to the area 197c and the $-1^{st}$ order beams of the stray beams transmitted through the area 197d are reflected by the mirror 65 to the area 197c (See FIG. 23). Accordingly, the $-1^{st}$ order beams of the stray beams reflected by the mirror 65 and transmitted again through the polarization converting optical element 197 do not have retardation added.

Thereby, the plural stray beams reflected from a recording layer located toward the −X side of the target recording layer all remain S polarized beams.

In other words, in the optical system 70', plural signal beams are converted to P polarized beams and plural stray beams remain S polarized beams.

The bundle of rays reflected from the mirror 65 and transmitted again through the polarization converting optical element 197 are incident on the polarization beam splitter 54. Only P polarized beams are transmitted through the polarization beam splitter 54 and are incident on the condenser lens 58. Thereby, the bundle of rays incident on the photo-detector includes plural signal beams only. Accordingly, the same effects can be attained as those of the above-described embodiments of the present invention. Thus, the number of components of the optical pickup can be reduced and the size of the optical pickup apparatus can be reduced.

That is, the optical system 70' include: the polarization beam splitter 54 located on the optical path of the reflected bundle of rays for splitting the reflected bundle of rays; the coupling lens 52 located in front of the polarization beam splitter 54 for condensing the reflected bundle of rays; the polarization converting optical element 197 located between a first imaginary plane that includes condensing areas of plural signal beams condensed by the coupling lens 52 and a second imaginary plane that is located more toward the coupling lens 52 than the first imaginary plane and includes condensing areas of plural stray beams condensed by the coupling lens 52, the polarization converting optical element 197 splitting plural signal beams and plural stray beams into two bundle of rays and controlling the polarization of the split bundle of rays so that one of the split bundle of rays has a different polarization than the other split bundle of rays; and a mirror 65 located on the first imaginary plane for reflecting the reflected bundle of rays transmitted through the polarization converting optical element 197 to the polarization converting optical element 197; wherein the polarization beam splitter 54 extracts plural signal beams from incident bundle of rays reflected from the mirror 65 and transmitted again through the polarization converting optical element 197 based on the difference in the polarization state of the incident bundle of rays.

In the optical system 70', since each dividing line of the polarization converting optical element 197 matches the direction corresponding to the tracking direction, plural signal beams and plural stray beams can be precisely separated even when the objective lens shifts in the tracking direction.

Furthermore, in the optical system 70', the polarization converting optical element 197 and the mirror 65 may be formed as a united body. In this case, the polarization converting optical element 197 and the mirror 65 may be formed as a united body by using a transparent material having refractivity greater than 1. Thereby, assembly procedures (steps) and adjustment procedures (steps) can be simplified.

Meanwhile, the optical axes of the $\pm 1^{st}$ order beams diffracted at the grating 200 are inclined with respect to the optical axis of the $0^{th}$ order beam.

Therefore, it is preferable that the orientation of the normal line of the reflecting plane of the mirror 65 for reflecting the $0^{th}$ order beam matches the orientation of the optical axis of the $0^{th}$ order beam, the orientation of the normal line of the reflecting plane of the mirror 65 for reflecting the $+1^{st}$ order beam matches the orientation of the optical axis of the $+1^{st}$ order beam, and the orientation of the normal line of the reflecting plane of the mirror 65 for reflecting the $-1^{st}$ order beam matches the orientation of the optical axis of the $-1^{st}$ order beam.

Figure 24:
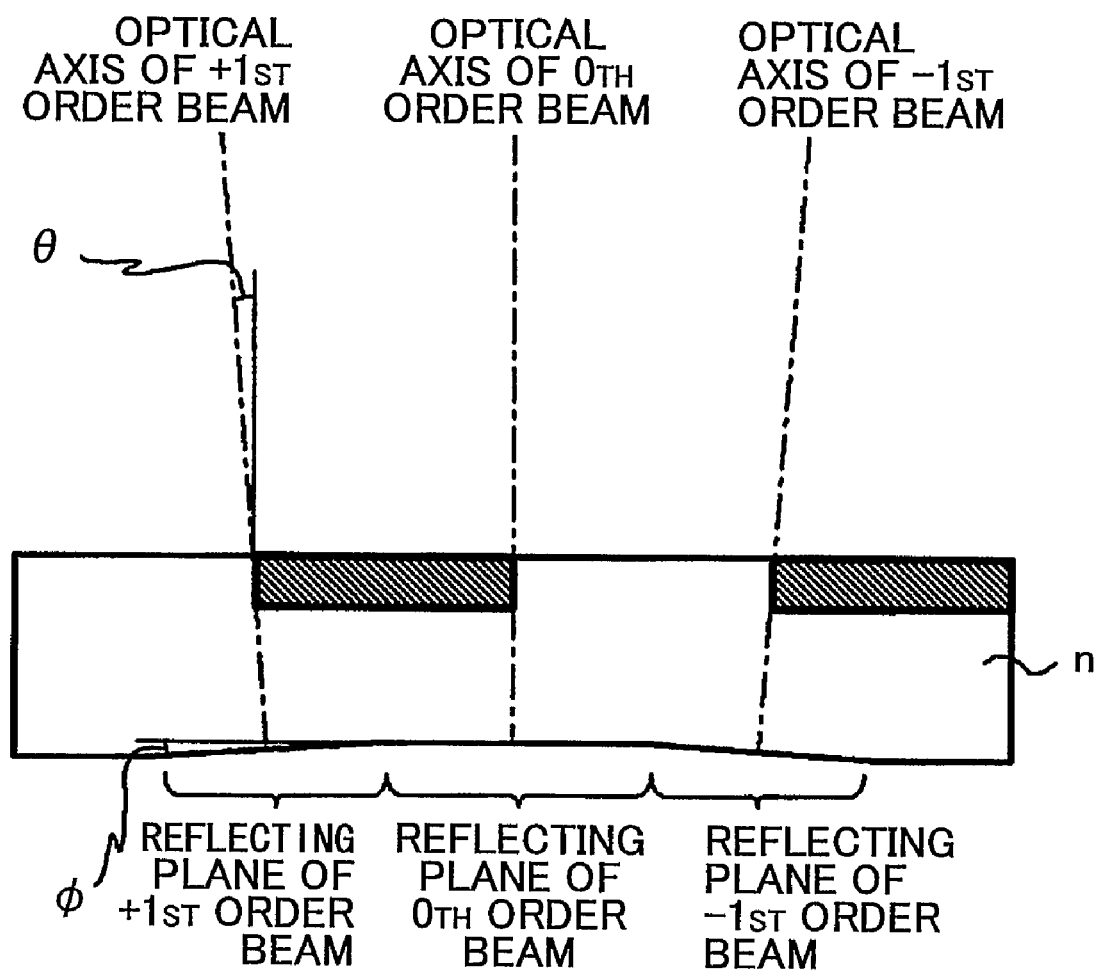
FIG. 24 is a schematic diagram for describing a first modified example of the optical system shown in FIG. 19 according to an embodiment of the present invention.
Figure 25:
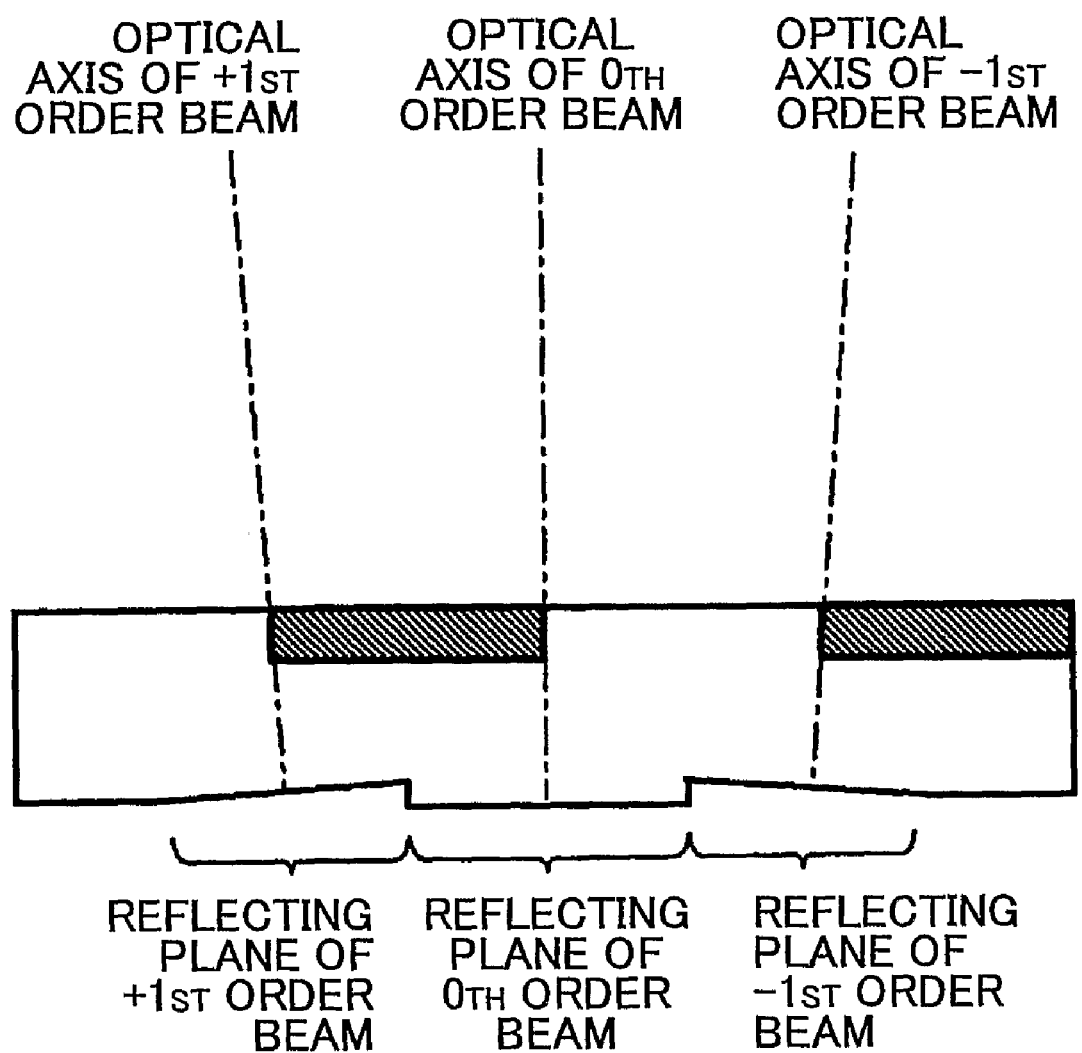
FIG. 25 is a schematic diagram for describing a second modified example of the optical system shown in FIG. 19 according to an embodiment of the present invention.

In this case, as shown in FIGS. 24 and 25, the reflecting planes of the $+1^{st}$ order beam and the $-1^{st}$ order beam may be inclined with respect to the reflecting plane of the $0^{th}$ order beam. For example, the reflecting plane of the $+1^{st}$ order beam can be inclined in an angle satisfying a relation of $\phi=\arcsin(n\sin\theta)$ with respect to the reflecting plane of the $0^{th}$ order beam in a case where the incident angle of the $+1^{st}$ order beam with respect to the polarization converting optical element 197 is "$\theta$" and the refractivity of the transparent material between the polarization converting optical element 197 and the mirror 65 is "n".

Figure 26:
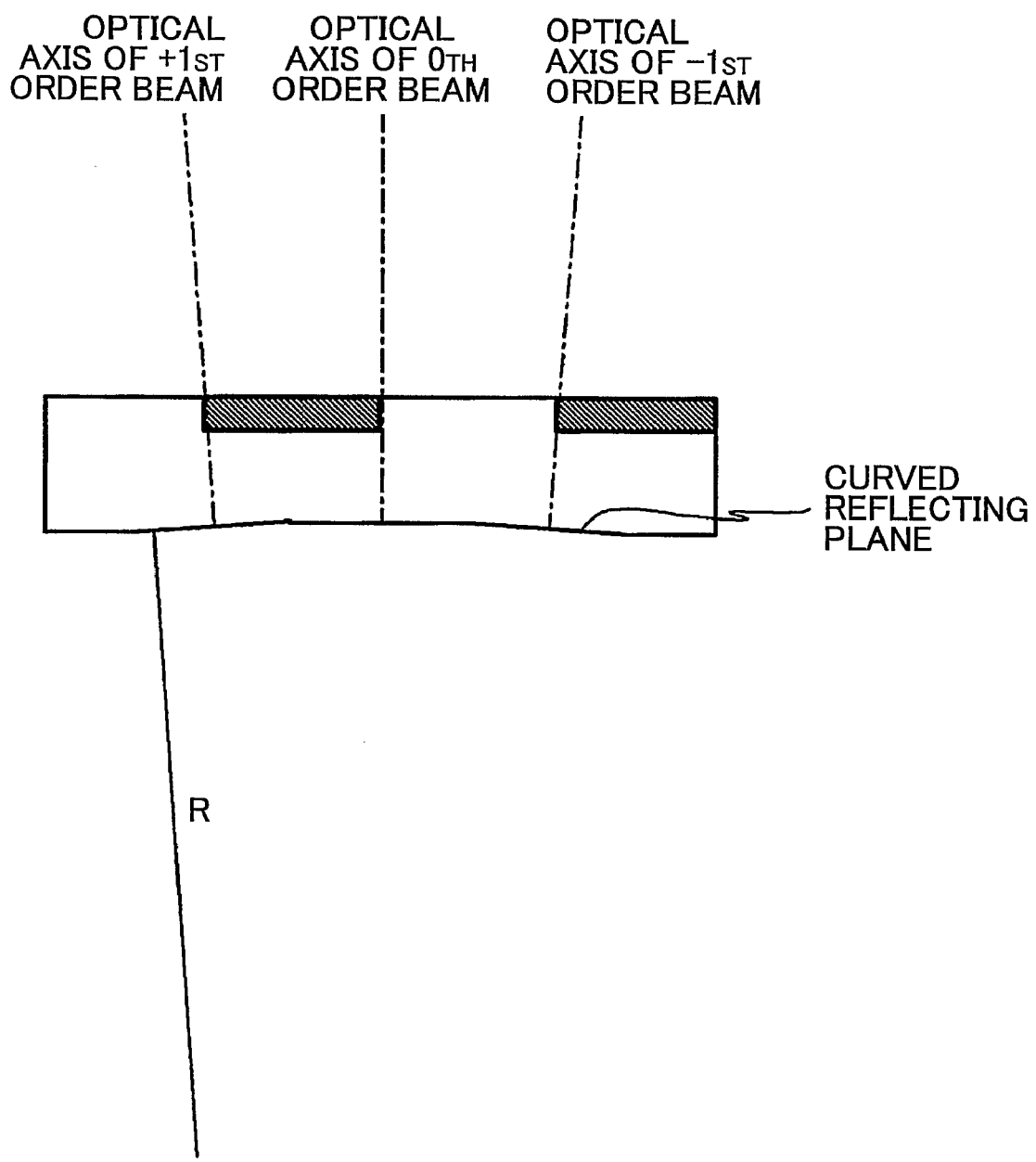
FIG. 26 is a schematic diagram for describing a third modified example of the optical system shown in FIG. 19 according to an embodiment of the present invention.
Figure 27:
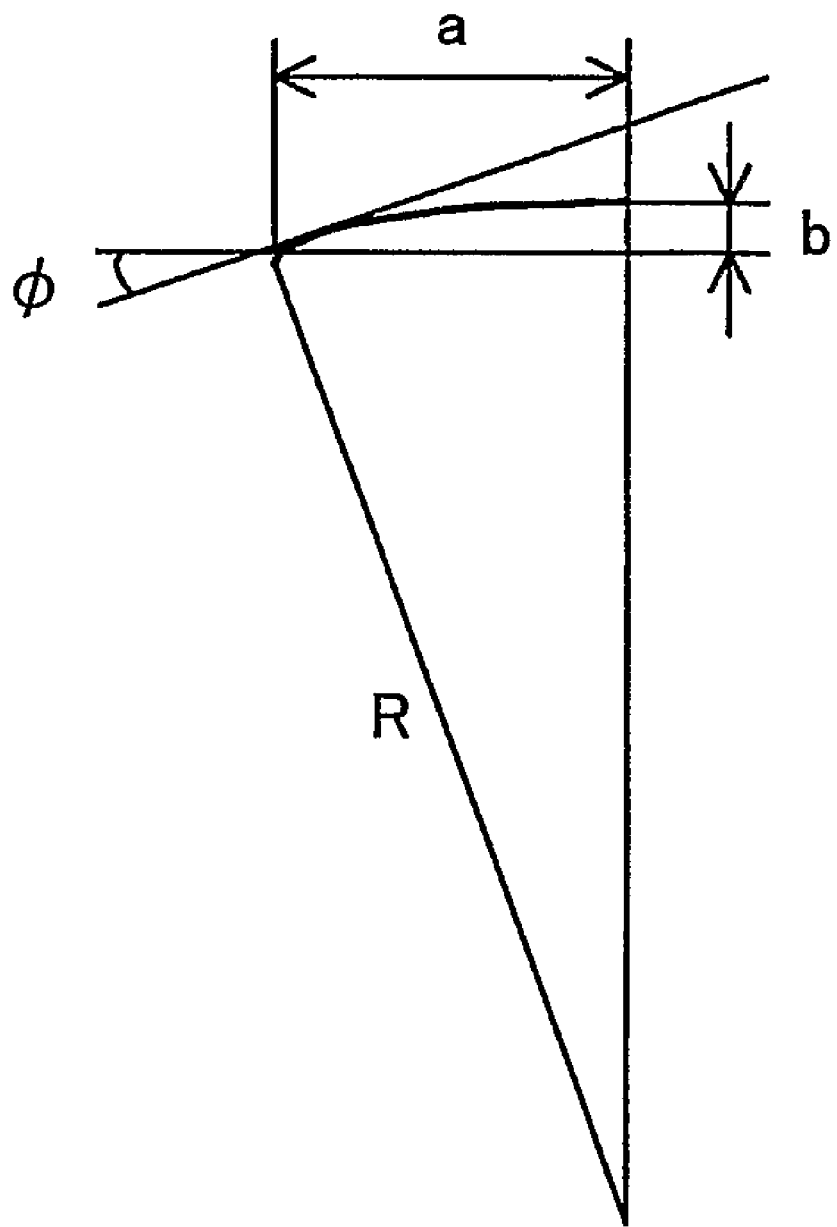
FIG. 27 is a schematic diagram for describing the curved reflecting plane shown in FIG. 26 according to an embodiment of the present invention.
Figure 28:
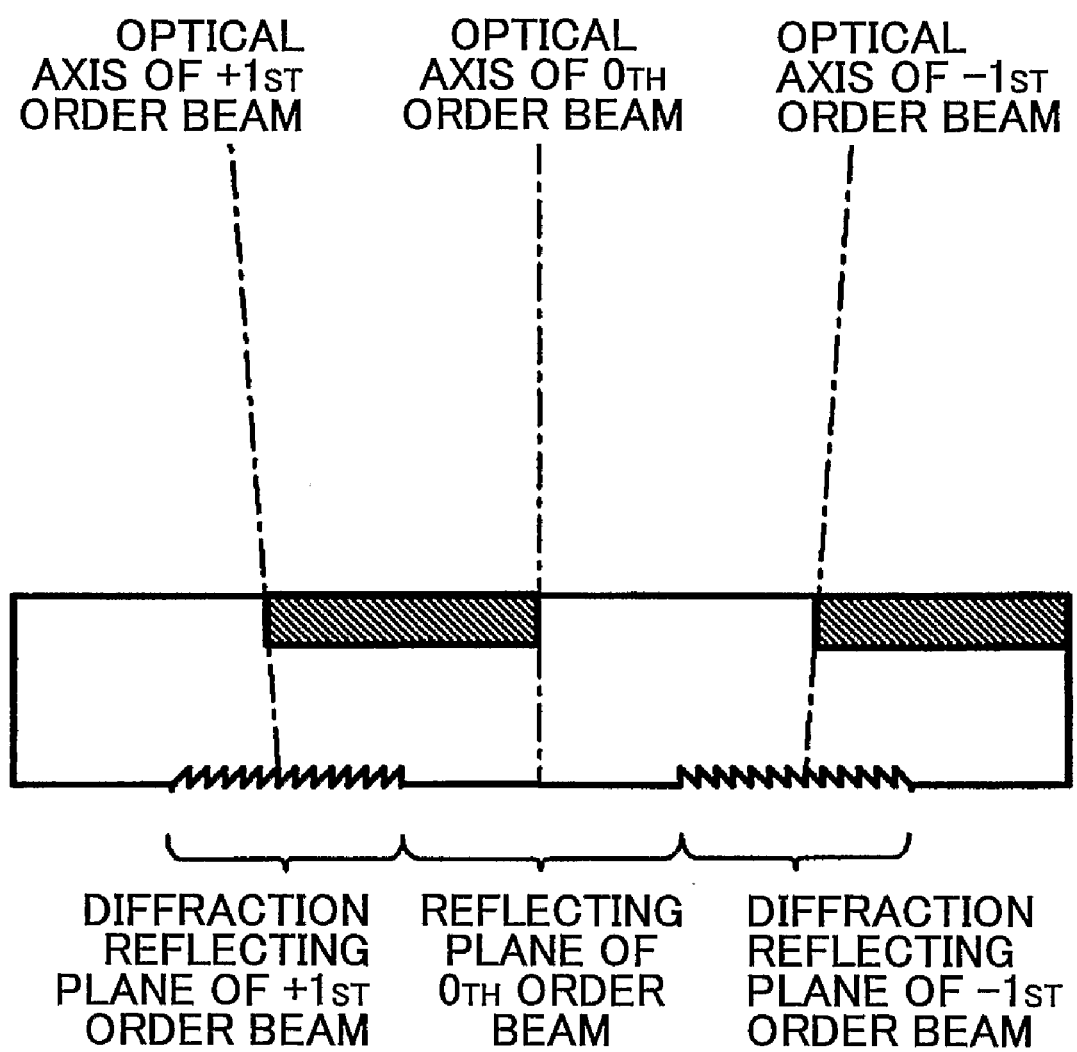
FIG. 28 is a schematic diagram for describing a fourth modified example of the optical system shown in FIG. 19 according to an embodiment of the present invention.
Figure 29:
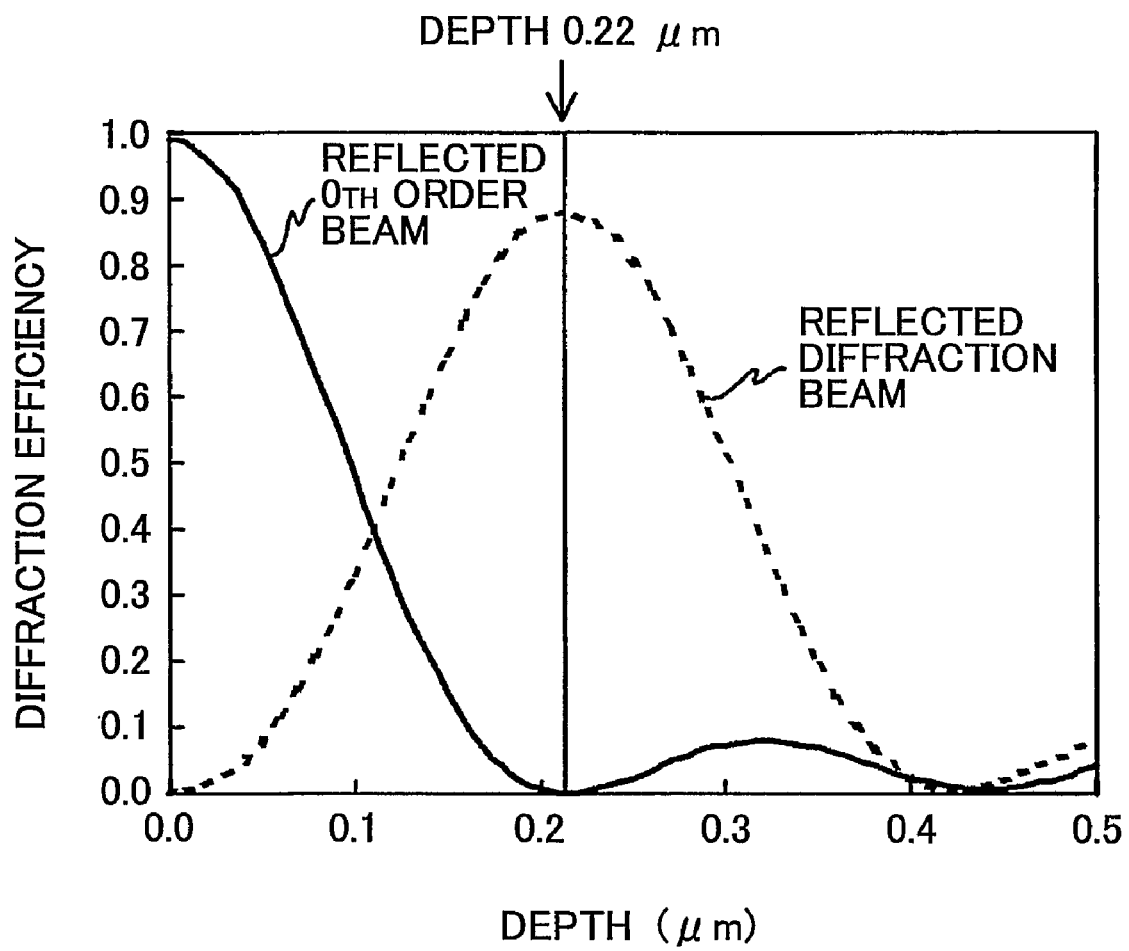
FIG. 29 is a schematic diagram for describing the depth of a diffraction grating of a diffracting reflecting plane shown in FIG. 28 according to an embodiment of the present invention.

Alternatively, as shown in FIG. 26, the reflecting plane of the mirror 65 may be curved so that the orientation of the normal line of a reflecting part of the mirror 65 for reflecting the $0^{th}$ order beam substantially matches the orientation of the optical axis of the $0^{th}$ order beam, the orientation of the normal line of a reflecting part of the mirror 65 for reflecting the $+1^{st}$ order beam substantially matches the orientation of the optical axis of the $+1^{st}$ order beam, and the orientation of the normal line of the reflecting part of the mirror 65 for reflecting the $-1^{st}$ order beam substantially matches the orientation of the optical axis of the $-1^{st}$ order. In this case, as shown in FIG. 27, the radius of curvature of the reflecting plane satisfies a relationship of "$R=a/\sin(\phi)$" in a case where the curved reflecting plane has the optical axis of the $+1^{st}$ order beam inclined in angle "$\phi$" with respect to the $0^{th}$ order beam and the distance of the $+1^{st}$ order beam with respect to the $0^{th}$ order beam is "a". Furthermore, the amount of sag "b" may be set to satisfy a relationship where "b" is no less than $R\times\{1-\cos(\phi)\}$ Alternatively, as shown in FIG. 28, a diffraction grating may be formed at a reflecting plane of the mirror 65 corresponding to the $+1^{st}$ order beam and another diffraction grating may be formed at another reflecting plane of the mirror 65 corresponding to the $-1^{st}$ order beam so that the orientation of an optical axis of an ingoing beam matches the orientation of an optical axis of an outgoing beam. For example, a reflecting type diffraction grating having a pitch of 23 μm and a depth of 0.22 μm may be formed at the reflecting plane of the $+1^{st}$ order beam when the wavelength is 405 nm, the angle of the $+1^{st}$ order beam is $\phi=0.505$ degrees, refractivity of the transparent material is n=1.4714, and Abbe's number is ve=65.41 (See FIG. 29)

Figure 30:
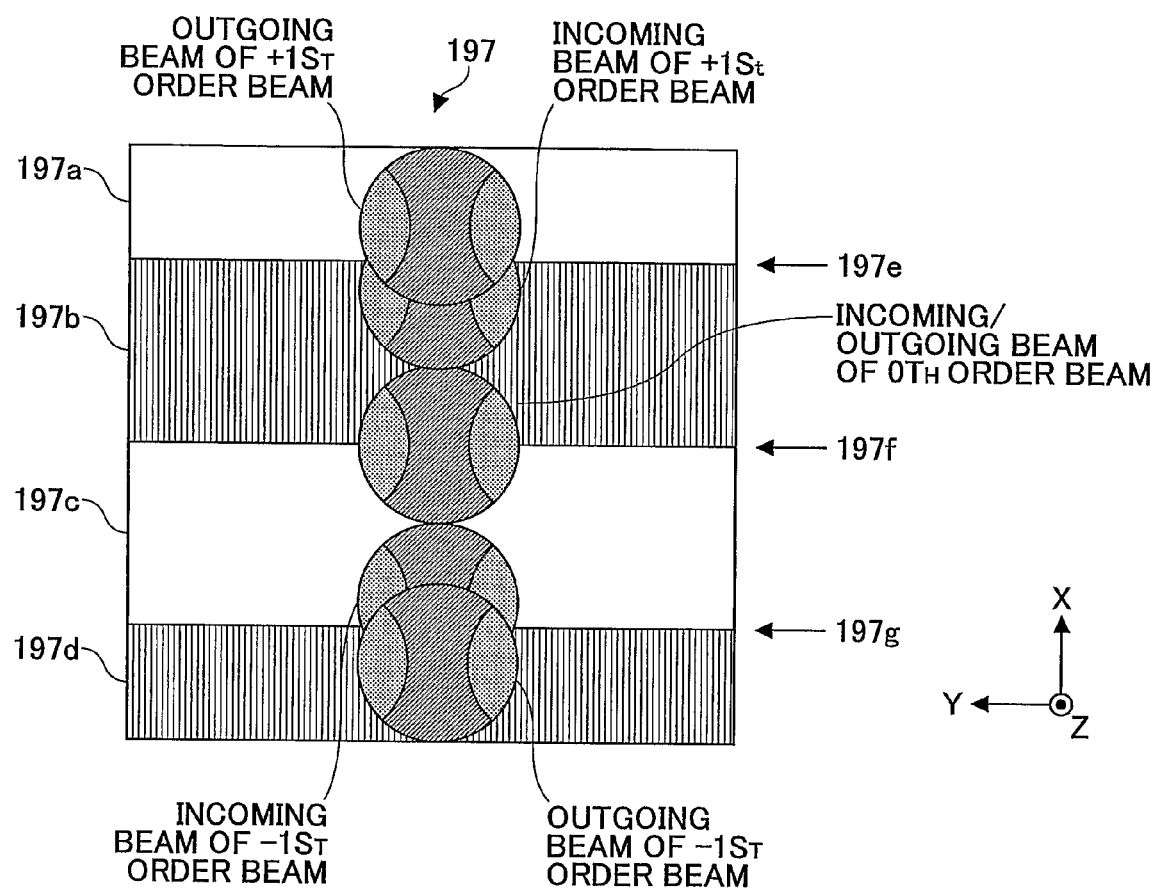
FIG. 30 is a schematic diagram for describing a fifth modified example of the optical system shown in FIG. 19 according to an embodiment of the present invention.

Without the mirror 65 having the reflecting planes of the $\pm 1^{st}$ order beams inclined with respect to the reflecting plane of $0^{th}$ order beam As shown in FIG. 30, the dividing lines which divide the polarization converting optical element 197 into plural areas may include a dividing line 197f intersecting with the optical axis of the $0^{th}$ order beam, a dividing line 197e extending between the optical axis of the $+1^{st}$ order beam incident (incoming) on the polarization converting optical element 197 and the optical axis of the $+1^{st}$ order beam reflected from the mirror 65 and emitted (outgoing) from the polarization converting optical element 197, and a dividing line extending between the optical axis of the $-1^{st}$ order beam and the $-1^{st}$ order beam reflected from the mirror 65 and emitted (outgoing) from the polarization converting optical element 197.

Furthermore, although the optical system 70' according to the above-described embodiment of the present invention is explained as having the condensing optical element positioned in front of (before) the polarizer, the condensing optical element may be positioned before (after) the polarizer. Furthermore, although the above-described embodiments of the present invention explain a case of irradiating three bundle of rays (beams) to the optical disc for obtaining push-pull signals according to, the same effects can be attained in a case of irradiating, for example, five or seven beams by increasing the number of divided areas of the polarization converting optical element in correspondence with the number of bundle of rays (beams) irradiated to the optical disc.

Although the optical disc apparatus 20 according to an embodiment of the present invention is described above as an apparatus that can record and reproduce information to/from the optical disc 15, the optical disc apparatus 20 includes other optical apparatuses as long as the apparatus can at least reproduce information of an optical disc.

Furthermore, although the optical disc 15 is described as having two layers, the optical disc 15 is not limited to having two layers. The optical disc 15 may alternatively have three or more layers. In this case, when the target recording layer is situated between two recording layers, the bundle of reflected beams include plural stray light beams (first stray light) which condense at a position closer to the focus point of plural signal light beams and additional plural stray light beams (second stray light) which condense at a position farther from the focus point of the plural signal light beams. Even in this case, plural signal light beams can be extracted. Furthermore, the optical disc 15 according to an embodiment of the present invention includes not only DVD type optical discs, but also CD type optical discs and next generation information recording media corresponding to a light beam having a wavelength of approximately 405 nm.

Furthermore, although the optical pickup apparatus 23 is described using an example of a single semiconductor laser, plural lasers may also be employed. For example, multiple semiconductor lasers that emit beams of different wavelengths may be used. In such a case, one semiconductor laser may emit a beam having a wavelength of approximately 405 nm, another semiconductor laser may emit a beam having a wavelength of approximately 660 nm, and yet another semiconductor laser may emit a beam having a wavelength of approximately 780 nm. In other words, the optical disc apparatus 20 according to an embodiment of the present invention includes an optical disc apparatus that is compatible with various optical discs of different standards, in which one of the optical discs may be an optical disc having plural recording layers.

Figure 31:
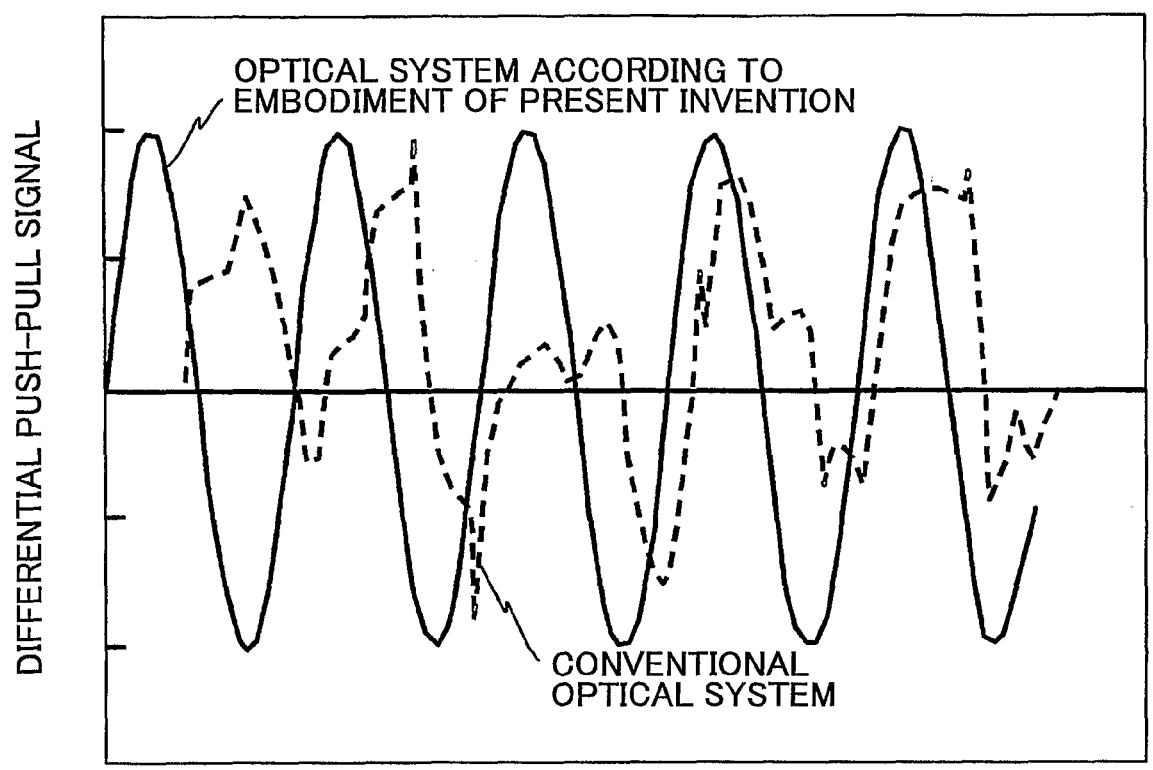
FIG. 31 is a graph for describing the effects of an optical system according to an embodiment of the present invention.

Thus, as shown in the exemplary graph of FIG. 31, although the differential push-pull signals of a conventional optical system exhibit irregular signal amplitude due to the influence of stray light, the differential push-pull signals of the optical system according to an embodiment of the present invention exhibit satisfactory sine wave amplitude.

Hence, with the above-described optical system according to an embodiment of the present invention, plural signal light beams can be efficiently extracted from a bundle of rays including plural signal beams and stray beams. Furthermore, with the optical pickup apparatus according to an embodiment of the present invention, desired signals can be precisely obtained from an optical disc having plural recording layers. Moreover, with the optical disc apparatus according to an embodiment of the present invention, an optical disc having plural recording layers can be steadily precisely accessed.

Further, the present invention is not limited to these embodiments, but variations and modifications may be made without departing from the scope of the present invention.

The present application is based on Japanese Priority Application Nos. 2006-225151, 2007-122024, and 2007-132385 filed on Aug. 22, 2006, May 7, 2007, and May 18, 2007, respectively, with the Japanese Patent Office, the entire contents of which are hereby incorporated by reference.

The invention claimed is:

1. An optical system for extracting a plurality of signal beams from a bundle of rays reflected from a multilayer optical disc, the reflected bundle of rays including the plural signal beams and a plurality of stray beams, the optical system comprising:
a polarizer situated on an optical path of the reflected bundle of rays for splitting the reflected bundle of rays;
a condensing optical element situated in front or in back of the polarizer for condensing the reflected bundle of rays;
a first polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the first polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays;
a second polarization converting optical element situated between the first imaginary plane and a third imaginary plane located farther from the condensing optical element than the first imaginary plane, the third imaginary plane including condensing areas at which the plural stray beams are condensed, the second polarization converting optical element having a plurality of divided areas facing the plural divided areas of the first polarization converting optical element for converting the polarization of the plural signal beams and the plural stray beams transmitted through the first polarization converting optical element so that the plural signal beams have a polarization different from the plural stray beams; and
an analyzer for extracting the plural signal beams from the reflected bundle of rays transmitted through the second polarization converting optical element based on the difference of polarization; and
wherein the first polarization converting optical element rotates polarization of one of the divided bundle of rays +45 degrees and rotates polarization of the other divided bundle of rays −45 degrees.

2. The optical system as claimed in claim 1, wherein the first and second polarization converting optical elements are formed as a united body by a transparent material having an index of refraction greater than 1.

3. An optical system for extracting a plurality of signal beams from a bundle of rays reflected from a multilayer optical disc, the reflected bundle of rays including the plural signal beams and a plurality of stray beams, the optical system comprising:
a polarizer situated on an optical path of the reflected bundle of rays for splitting the reflected bundle of rays;
a condensing optical element situated in front or in back of the polarizer for condensing the reflected bundle of rays;
a polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays; and
a reflecting member situated on the first imaginary plane for reflecting the reflected bundle of rays transmitted through the polarization converting optical element to the polarization converting optical element; and
wherein the reflected bundle of rays reflected from the reflecting member is incident on the polarizer and has the plural signal beams extracted therefrom based on the difference of polarization by the polarizer; and
wherein the reflected bundle of rays includes a $0^{th}$ order beam, a $+n^{th}$ order beam, and a $-n^{th}$ order beam, wherein n is an integer no less than 1, wherein the plural divided areas are divided by a plurality of dividing lines, wherein the plural dividing lines include a dividing line intersecting with an optical axis of the $0^{th}$ order beam, a dividing line extending between an optical axis of the $+n^{th}$ order beam incident on the polarization converting optical element and another optical axis of the $+n^{th}$ order beam reflected from the reflecting member and emitted from the polarization converting optical element, and a dividing line extending between an optical axis of the $-n^{th}$ order beam and another optical axis of the $-n^{th}$ order beam reflected from the reflecting member and emitted from the polarization converting optical element.

4. The optical system as claimed in claim 3, wherein the polarization converting optical element and the reflecting member are formed as a united body by a transparent material having an index of refraction greater than 1.

5. An optical system for extracting a plurality of signal beams from a bundle of rays reflected from a multilayer optical disc, the reflected bundle of rays including the plural signal beams and a plurality of stray beams, the optical system comprising:
a polarizer situated on an optical path of the reflected bundle of rays for splitting the reflected bundle of rays;

a condensing optical element situated in front or in back of the polarizer for condensing the reflected bundle of rays;

a polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays; and a reflecting member situated on the first imaginary plane for reflecting the reflected bundle of rays transmitted through the polarization converting optical element to the polarization converting optical element; and wherein the reflected bundle of rays reflected from the reflecting member is incident on the polarizer and has the plural signal beams extracted therefrom based on the difference of polarization by the polarizer; and wherein the reflected bundle of rays includes a $0^{th}$ order beam, a $+n^{th}$ order beam, and a $-n^{th}$ order beam, wherein n is an integer no less than 1, wherein the reflecting member includes a first reflecting plane for reflecting the $0^{th}$ order beam, a second reflecting plane for reflecting the $+n^{th}$ order beam, and a third reflecting plane for reflecting the $-n^{th}$ order beam, wherein the orientation of a normal line of the first reflecting plane matches the orientation of an optical axis of the $0^{th}$ order beam, the orientation of a normal line of the second reflecting plane matches the orientation of an optical axis of the $+n^{th}$ order beam, and the orientation of a normal line of the third reflecting plane matches the orientation of an optical axis of the $-n^{th}$ order beam.

6. An optical system for extracting a plurality of signal beams from a bundle of rays reflected from a multilayer optical disc, the reflected bundle of rays including the plural signal beams and a plurality of stray beams, the optical system comprising:

a polarizer situated on an optical path of the reflected bundle of rays for splitting the reflected bundle of rays;

a condensing optical element situated in front or in back of the polarizer for condensing the reflected bundle of rays;

a polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays; and a reflecting member situated on the first imaginary plane for reflecting the reflected bundle of rays transmitted through the polarization converting optical element to the polarization converting optical element; and wherein the reflected bundle of rays reflected from the reflecting member is incident on the polarizer and has the plural signal beams extracted therefrom based on the difference of polarization by the polarizer; and wherein the reflected bundle of rays includes a $0^{th}$ order beam, a $+n^{th}$ order beam, and a $-n^{th}$ order beam; wherein n is an integer no less than 1, wherein the reflecting member includes a first reflecting part for reflecting the $0^{th}$ order beam, a second reflecting part for reflecting the $+n^{th}$ order beam, and a third reflecting part for reflecting the $-n^{th}$ order beam, wherein the orientation of a normal line of the first reflecting part substantially matches the orientation of an optical axis of the $0^{th}$ order beam, the orientation of a normal line of the second reflecting part substantially matches the orientation of an optical axis of the $+n^{th}$ order beam, and the orientation of a normal line of the third reflecting plane substantially matches the orientation of an optical axis of the $-n^{th}$ order beam.

7. An optical system for extracting a plurality of signal beams from a bundle of rays reflected from a multilayer optical disc, the reflected bundle of rays including the plural signal beams and a plurality of stray beams, the optical system comprising:

a polarizer situated on an optical path of the reflected bundle of rays for splitting the reflected bundle of rays;

a condensing optical element situated in front or in back of the polarizer for condensing the reflected bundle of rays;

a polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays; and a reflecting member situated on the first imaginary plane for reflecting the reflected bundle of rays transmitted through the polarization converting optical element to the polarization converting optical element; and wherein the reflected bundle of rays reflected from the reflecting member is incident on the polarizer and has the plural signal beams extracted therefrom based on the difference of polarization by the polarizer; and wherein the reflected bundle of rays includes a $0^{th}$ order beam, a $+n^{th}$ order beam, and a $-n^{th}$ order beam, wherein n is an integer no less than 1, wherein the reflecting member includes a first reflecting plane for reflecting the $0^{th}$ order beam, a second reflecting plane for reflecting the $+n^{th}$ order beam, and a third reflecting plane for reflecting the $-n^{th}$ order beam, wherein the orientation of a normal line of the first reflecting plane matches the orientation of an optical axis of the $0^{th}$ order beam, wherein the second reflecting plane includes a diffraction grating for matching an optical axis of an ingoing beam with an optical axis of an outgoing beam, wherein the third reflecting plane includes a diffraction grating for matching an optical axis of an ingoing beam with an optical axis of an outgoing beam.

8. An optical system for extracting a plurality of signal beams from a bundle of rays reflected from a multilayer optical disc, the reflected bundle of rays including the plural signal beams and a plurality of stray beams, the optical system comprising:

a polarizer situated on an optical path of the reflected bundle of rays for splitting the reflected bundle of rays;

a condensing optical element situated in front or in back of the polarizer for condensing the reflected bundle of rays;

a first polarization converting optical element situated between a first imaginary plane and a second imaginary plane, the first imaginary plane including condensing areas at which the plural signal beams are condensed by the condensing optical element, the second imaginary plane including condensing areas at which the plural stray beams are condensed by the condensing optical element, the first polarization converting optical element having a plurality of divided areas for dividing the plural signal beams and the plural stray beams into two bundles of rays and converting polarization of the divided bundles of rays so that one of the divided bundles of rays has a polarization different from the other divided bundle of rays;

a second polarization converting optical element situated between the first imaginary plane and a third imaginary plane located farther from the condensing optical element than the first imaginary plane, the third imaginary plane including condensing areas at which the plural stray beams are condensed, the second polarization converting optical element having a plurality of divided areas facing the plural divided areas of the first polarization converting optical element for converting the polarization of the plural signal beams and the plural stray beams transmitted through the first polarization converting optical element so that the plural signal beams have a polarization different from the plural stray beams; and an analyzer for extracting the plural signal beams from the reflected bundle of rays transmitted through the second polarization converting optical element based on the difference of polarization; and wherein the reflected bundle of rays include a $0^{th}$ order beam, a $+n^{th}$ order beam, and a $-n^{th}$ order beam, wherein n is an integer no less than 1, wherein a reflecting member includes a first reflecting plane for reflecting the $0^{th}$ order beam, a second reflecting plane for reflecting the $+n^{th}$ order beam, and a third reflecting plane for reflecting the $-n^{th}$ order beam, wherein the orientation of a normal line of the first reflecting plane matches the orientation of an optical axis of the $0^{th}$ order beam, wherein the second reflecting plane includes a diffraction grating for matching an optical axis of an ingoing beam with an optical axis of an outgoing beam, wherein the third reflecting plane includes a diffraction grating for matching an optical axis of an ingoing beam with an optical axis of an outgoing beam.

* * * * *